United States Patent
Trout et al.

(10) Patent No.: US 12,032,515 B2
(45) Date of Patent: *Jul. 9, 2024

(54) DATA MIGRATION MANAGEMENT AND MIGRATION METRIC PREDICTION

(71) Applicant: Integrated Media Technologies, Inc., Burbank, CA (US)

(72) Inventors: Jonathan D. Trout, Carlsbad, CA (US); Roy Burns, Santa Clarita, CA (US)

(73) Assignee: Integrated Media Technologies, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,834

(22) Filed: Jan. 3, 2023

(65) Prior Publication Data

US 2023/0177003 A1    Jun. 8, 2023

Related U.S. Application Data

(63) Continuation of application No. 16/932,410, filed on Jul. 17, 2020, now Pat. No. 11,544,219.

(51) Int. Cl.
*G06F 16/11* (2019.01)
*G06F 16/13* (2019.01)
(Continued)

(52) U.S. Cl.
CPC .......... *G06F 16/119* (2019.01); *G06F 16/128* (2019.01); *G06F 16/13* (2019.01); *G06F 16/148* (2019.01); *G06N 5/02* (2013.01)

(58) Field of Classification Search
CPC ...... G06F 16/119; G06F 16/148; G06F 16/13; G06F 16/128; G06F 11/1451;
(Continued)

(56) References Cited

U.S. PATENT DOCUMENTS 9,590,886 B2   3/2017  Kripalani et al.
10,334,044 B1 *  6/2019  Bigman ................ G06F 3/0607
(Continued)

OTHER PUBLICATIONS

Product: Archiware; Company: Archiware GMBH; <URL: https://www.archiware.com>, 8 pages.
(Continued)

*Primary Examiner* — Evan Aspinwall
(74) *Attorney, Agent, or Firm* — Sheppard, Mullin, Richter & Hampton LLP

(57) ABSTRACT

A query specifying a source repository and a target repository is received from a client device. A source index is generated that corresponds to the source repository and represents a snapshot of metadata associated with data contained in the source data repository. The source index is filtered based on filtering criteria specified by the query to obtain a filtered source index. Attributes of data corresponding to the filtered source index are determined as well as data retrieval type parameters. Without initiating a data migration of the data corresponding to the filtered source index from the source repository to the target repository, predicted data migration metrics associated with the data migration are determined and presented to an end user of the client device. The end user is provided with the capability to initiate or forego the data migration based on an evaluation of the predicted data migration metrics.

21 Claims, 16 Drawing Sheets

(51) Int. Cl.
*G06F 16/14* (2019.01)
*G06N 5/02* (2023.01)

(58) Field of Classification Search
CPC .... G06F 2201/84; G06F 3/065; G06F 16/164; G06F 11/1448; G06F 16/1748; G06F 11/1435; G06F 16/122; G06F 3/0643; G06F 3/0647; G06F 3/0653; G06F 3/0652; G06F 3/0649; G06F 3/0637; G06F 3/0626; G06F 16/1844; G06N 5/02
USPC ......................................... 707/741, 648, 654
See application file for complete search history.

(56) References Cited

U.S. PATENT DOCUMENTS

| | | | |
|---|---|---|---|
| 2014/0006357 A1 | 1/2014 | Davis et al. | |
| 2014/0181047 A1* | 6/2014 | Pawar | G06F 11/1451 707/654 |
| 2014/0181048 A1* | 6/2014 | Varadharajan | G06F 3/065 707/661 |
| 2015/0199367 A1 | 7/2015 | Hammer et al. | |
| 2016/0004605 A1* | 1/2016 | Ahn | G06F 11/1451 707/679 |
| 2021/0019063 A1 | 1/2021 | Lee et al. | |
| 2021/0034244 A1* | 2/2021 | Ausarkar | G06F 11/1464 |

OTHER PUBLICATIONS

Product: Aspera; Company: IBM; <URL: https://www.IBM.com/products/aspera>, 21 pages.=.
Product: Atempo Miria; Company: Atempto; <URL: https://www.atempo.com>, 15 pages.
Product: AWS Datasync; Company: Amazon; <URL: https://aws.amazon.com/datasync/?whats-new-cards.sort-by=item.additionalFields.postDateTime&whats-new-cards.sort-order=desc>, 13 pages.
Product: Cloudfirst; Company: Cloudfirst Inc.; <URL: https://cloudfirst.io>, 17 pages.
Product: CloudIQ; Company: Dell Technologies; <URL: https://www.delltechnologies.com/en-us/storage/cloudiq.htm>, 12 pages.
Product: CloudPools; Company: Dell Technologies; <URL: https://www.dellemc.com/resources/en-us/asset/white-papers/products/storage/h14775-isilon-cloud-pools-and-ecs-solution-guide.pdf>, 63 pages.
Product: Cohesity; Company: Cohesity Inc.; <URL: https://www.cohesity.com>, 27 pages.
Product: Diva; Company: Ecodigital; <URL: https://www.goecodigital.com>, 5 pages.
Product: Flextier; Company: Quantum Corporation; <URL: https://www.quantum.com/en/products/stornext-file-system/>, 47 pages.
Product: Igneous; Company: Igneous, Inc.; <URL: https://www.igneous.io>, 17 pages.
Product: Komprise; Company: Komprise; <URL: https://www.komprise.com>, 12 pages.
Product: Rubrik; Company: Rubrik the Cloud Data Management Company; <URL: https://www.rubrik.com/en>, 18 pages.
Product: Signiant; Company: Signiant Inc.; <URL: https://www.signiant.com>, 9 pages.
Product: Starfish Storage; Company: Starfish Storage Corporation; <URL: https://starfishstorage.com>, 8 pages.
Product: Storage DNA; Company: StorageDNA, Inc.; <URL: https://www.storagedna>, 9 pages.
Product: Storcycle; Company: Spectra Logic Corporation; <URL: https://spectralogic.com/products/storcycle/>, 21 pages.
Product: Xendata; Company: Xendata Inc.; <URL: https://xendata.com>, 11 pages.

* cited by examiner

FIG. 10

Jobs

1-10 of 34

UI 1002

Quick Transfer — 1004
Search — 1006

1008

| INITIATED BY | SOURCE | TARGET | COST/TYPE | SIZE | SPEED | DURATION | INITIATED | STATUS |
|---|---|---|---|---|---|---|---|---|
| Move S02E01 | SMB Media | + S3 Media | | 6.55GB | 146 Mbps | 25s | 9/11/19 04:21 PM | 15% (1h 56s) |
| QT September 11 | S3 Media | + NFS Media | $38 | 419.44GB | 135 Mbps | 2h 14m | 9/11/19 04:04 PM | 9/11/19 06:16 PM |
| S01E04 Media Restore | S3 Media | + SMB Media | $1 | 16.45GB | 660 Mbps | 10m 18s | 9/11/19 04:00 PM | 9/11/19 04:10 PM |
| S01E04 Media Restore | S3 Media | + SMB Media | $1 | 16.45GB | 652 Mbps | 5m 8s | 9/11/19 03:59 PM | 9/11/19 04:04 PM |
| Set Dailies | SMB Media | + S3 Media | | 31.39GB | 143 Mbps | 10m 37s | 9/11/19 03:58 PM | 9/11/19 04:09 PM |
| Set Dailies | SMB Media | + SMB Media | | 31.39GB | 623 Mbps | 10m 56s | 9/11/19 03:59 PM | 9/11/19 04:09 PM |
| S01E11 Media Restore | S3 Media | + SMB Media | $1 | 19.45GB | 152 Mbps | 5m 17s | 9/10/19 03:58 PM | 9/10/19 04:04 PM |
| Monthly Dailies | SMB Media | + S3 Media | | 31.39GB | 147 Mbps | 10m 20s | 9/10/19 03:58 PM | 9/10/19 04:06 PM |
| QT September 9 | Media Deep Archive | + NFS Media | $327 | 2.91TB | 637 Mbps | 18h 24m | 9/08/19 01:05 PM | 9/09/19 07:29 AM |

DATA MIGRATION MANAGEMENT AND MIGRATION METRIC PREDICTION

CROSS REFERENCE TO RELATED APPLICATION

This application is a continuation of U.S. Nonprovisional application Ser. No. 16/932,410, entitled "Data Migration Management And Migration Metric Prediction," filed on Jul. 17, 2020, now U.S. Pat. No. 11,544,219, which is incorporated by reference in its entirety herein for all purposes.

TECHNICAL FIELD

This disclosure pertains to data migration management, and more particularly, in some example embodiments, to predicting data migration metrics in advance of initiating a data migration and generating, storing, and reporting data storage and data migration metrics.

BACKGROUND

In modern computing systems, data may be stored on-premises and/or in a cloud storage environment. Various costs may be associated with storing and migrating data to and from a cloud storage environment and/or between different storage tiers on-premises. Data movers may facilitate the management of data migration between different storage devices and locations. Conventional data movers suffer from a variety of technical problems including the inability to adequately predict or track data migration metrics. In addition, conventional data movers lack the capability to correlate various data migration metrics to various entities at a level of granularity desired by an end user. Discussed herein are technical solutions that address these and other technical problems associated with conventional data movers.

SUMMARY

In an example embodiment, a computer-implemented method is disclosed. The method includes receiving, from a client device, a query specifying a source data repository and a target data repository. In addition, a source index is generated. The source index corresponds to the source data repository and represents a snapshot of metadata associated with data contained in the source data repository. The source index is filtered based at least in part on one or more filtering criteria specified by the query to obtain a filtered source index. One or more attributes of data corresponding to the filtered source index are determined as well as one or more data retrieval type parameters. The method additionally includes determining, without initiating a data migration of the data corresponding to the filtered source index from the source data repository to the target data repository, one or more predicted data migration metrics associated with the data migration and presenting, to an end user of the client device, a user interface that includes an indication of the one or more predicted data migration metrics.

In an example embodiment, the one or more filtering criteria based on which the source index is filtered include one or more of a file type, a file size, a filename, or file modification attributes. In an example embodiment, the filtering criteria may be specified by a third-party application or system.

In an example embodiment, the one or more attributes of the data corresponding to the filtered source index include a number of one or more files contained in the data corresponding to the filtered source index and an aggregate file size of the one or more files.

In an example embodiment, determining the one or more data retrieval type parameters includes presenting, via the user interface, a set of data retrieval type options for the data migration, where the set of data retrieval type options includes a first data retrieval type option and a second data retrieval type option, and the second data retrieval type option corresponds to a faster retrieval time and a higher cost than the first data retrieval type option. A data retrieval type parameter may then correspond to a selection of particular data retrieval type option received via the user interface.

In an example embodiment, determining, without initiating the data migration, the one or more predicted data migration metrics includes determining a predicted cost of the data migration based at least in part on the aggregate file size and the selected data retrieval type option.

In an example embodiment, determining, without initiating the data migration, the one or more predicted data migration metrics includes determining a strength of a network connection between a first storage device storing the source data repository and a second storage device storing the target data repository and determining a predicted duration of time to complete the data migration based at least in part on the strength of the network connection.

In an example embodiment, the data corresponding to the filtered source index is first data and the one or more data attributes includes a number of files contained in the first data. In an example embodiment, the method additionally includes determining that the number of files contained in the first data exceeds a threshold number of files and determining, based at least in part on determining that the number of files contained in the first data exceeds the threshold value, that a target index corresponding to the target data repository is required for determining the one or more predicted data migration metrics. In an example embodiment, the target index represents a snapshot of metadata associated with second data contained in the target data repository.

In an example embodiment, the data corresponding to the filtered source index is first data and data contained in the target data repository is second data. In an example embodiment, the method additionally includes identifying a data migration setting specified by the query, the data migration setting indicating that each file in the first data for which a duplicate corresponding file exists in the second data is not to be migrated from the source data repository to the target data repository, and determining, based at least in part on identifying the data migration setting, that a target index corresponding to the target data repository is required for determining the one or more predicted data migration metrics.

In an example embodiment the method additionally includes, prior to determining the one or more predicted data migration metrics, generating the target index and determining a difference between the filtered source index and the target index, where determining the difference includes identifying each file in the filtered source index for which a duplicate corresponding file exists in the target index and filtering out from the filtered source index each file in the filtered source index for which the duplicate corresponding file exists in the target index.

In an example embodiment, the method additionally includes receiving, at the user interface, a selection to initiate the data migration of the data corresponding to the filtered source index from the source data repository to the target data repository; initiating the data migration; determining that the data migration is complete; generating one or more metrics indicative of at least one of a data storage characteristic, a data migration characteristic, or a data migration correlation characteristic of the data migration; and storing the one or more metrics. In an example embodiment, the one or more metrics are retrievable and presentable via one or more graphical user interfaces responsive to a request received from the client device on behalf of the end user.

In an example embodiment, a system is disclosed. The system includes at least one processor and at least one memory storing computer-executable instructions. The at least one processor is configured to access the at least one memory and execute the computer-executable instructions to perform a set of operations including receiving, from a client device, a query specifying a source data repository and a target data repository and generating a source index that corresponds to the source data repository and represents a snapshot of metadata associated with data contained in the source data repository. The source index is filtered based at least in part on one or more filtering criteria specified by the query to obtain a filtered source index. Attribute(s) of data corresponding to the filtered source index are determined as well as data retrieval type parameter(s). The set of operations additionally includes determining, without initiating a data migration of the data corresponding to the filtered source index from the source data repository to the target data repository, one or more predicted data migration metrics associated with the data migration and presenting, to an end user of the client device, a user interface that includes an indication of the one or more predicted data migration metrics.

The above-described system is further configured to perform any of the operations/functions and may include any of the additional features/aspects of example embodiments of the invention described above in relation to example computer-implemented methods of the invention.

In an example embodiment, a computer program product is disclosed. The computer program product includes a non-transitory computer-readable medium readable by a processing circuit. The non-transitory computer-readable medium stores instructions executable by the processing circuit to cause a method to be performed. The method includes receiving, from a client device, a query specifying a source data repository and a target data repository and generating a source index corresponding to the source data repository and representing a snapshot of metadata associated with data contained in the source data repository. The source index is filtered based at least in part on one or more filtering criteria specified by the query to obtain a filtered source index. One or more attributes of data corresponding to the filtered source index are determined as well as one or more data retrieval type parameters. The method additionally includes determining, without initiating a data migration of the data corresponding to the filtered source index from the source data repository to the target data repository, one or more predicted data migration metrics associated with the data migration and presenting, to an end user of the client device, a user interface that includes an indication of the one or more predicted data migration metrics.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 10 depicts an example GUI listing various data migration jobs and corresponding metrics in accordance with example embodiments of the invention.

FIG. 11 depicts an example GUI overlay presenting more detailed metrics relating to a particular data migration job selected from the GUI depicted in FIG. 10 in accordance with example embodiments of the invention.

DETAILED DESCRIPTION

Figure 1A:
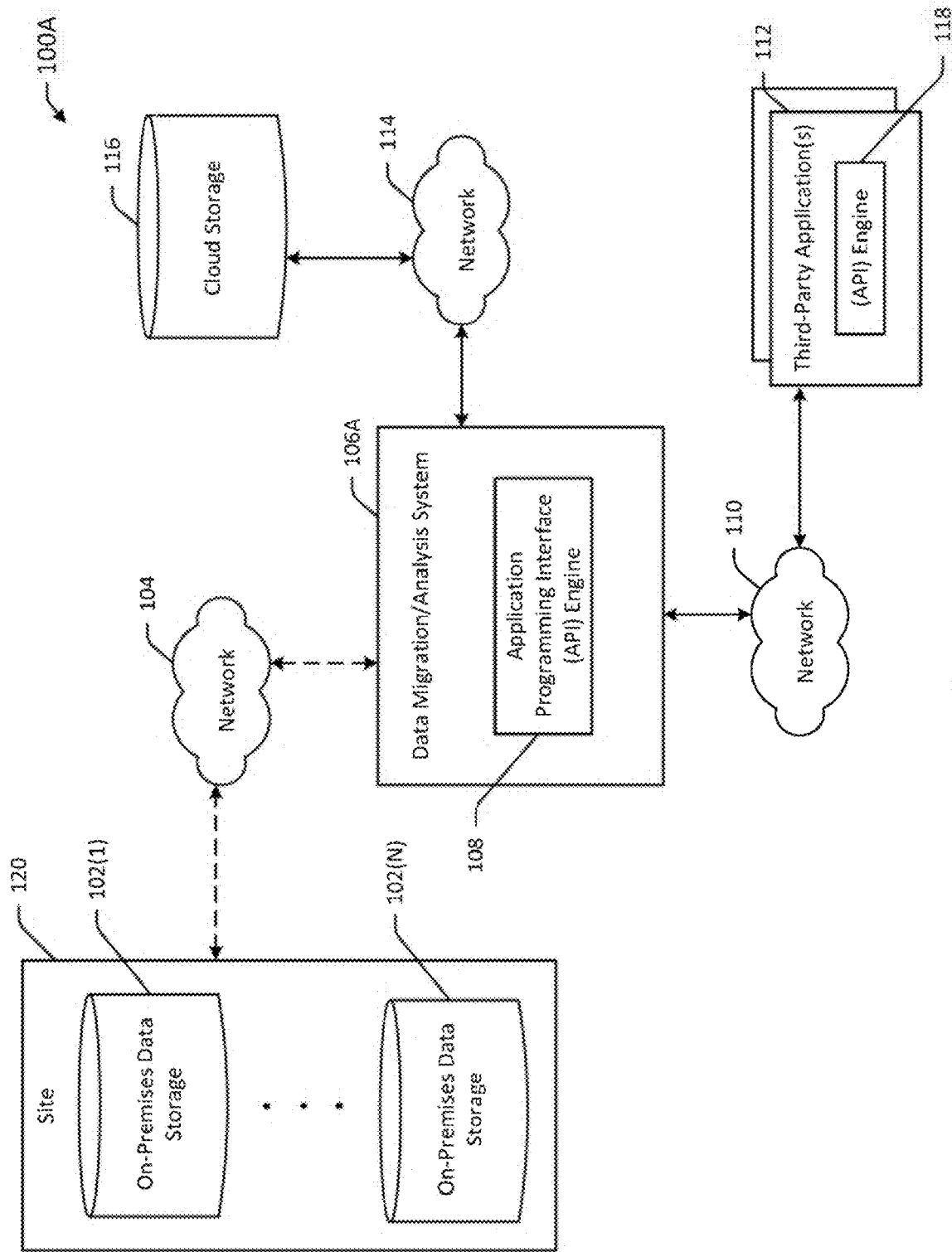
FIG. 1A depicts an example networked environment that includes a data migration/analysis system configured to interact with third-party client applications via one or more application programming interface (API) engines and further configured to manage data migrations across on-premises data storage tiers as well as to and from a cloud storage environment in accordance with example embodiments of the invention.

Modern computing systems often store and operate on a wide variety of types of data including, for example, structured data, unstructured data, multimedia data, text data, and so forth. Such data may be stored across a number of storage devices, which may have different storage capacities, data access rates, and the like. For instance, data stored on-premises may be stored across different data storage tiers depending on the type of data and how often it will be accessed. In addition, as network connectivity and data transfer speeds have improved, storing data in a cloud storage environment has become increasingly common. As more data is stored in the cloud, the number of on-premises storage devices that need to be maintained and managed is reduced. This serves as an attractive incentive to utilize cloud storage, particularly for customers with significant data storage needs. In example scenarios, a service provider entity may own and operate cloud data storage and provide storage capacity in the cloud to various customer entities in accordance with various pricing models. Such pricing models may charge for storing data in the cloud storage environment based on the type of data, the amount of data being stored, the data retrieval/data transfer rates associated with retrieval and/or migrating data to and from the cloud storage, and the like.

In example scenarios, a data mover may be provided to facilitate data migration between different storage devices. Generally speaking, a data mover may be collection of hardware, firmware, and/or software component(s) configured to manage the movement of data between different storage devices/repositories. In some cases, a data mover may retrieve data from a storage device and make it available to a network client. In other cases, a data mover may receive data from a network client and store it in a particular storage device. In still other cases, a data mover may migrate data from one repository to another.

While companies are beginning to move beyond purely on-premises data storage and are increasingly turning to cloud storage environments to meet their data storage needs, this transition has not come without a host of technical problems, which remain unaddressed by existing data movers. Such technical problems include, for example, the lack of integration between existing data movers and a customer's existing data access technologies including issues such as proprietary vendor lock-in, multi-protocol translation issues, maintaining permissions, or the like; the absence of a user-friendly interface for initiating data transfers to and from cloud storage; a complicated cloud storage pricing structure that makes it difficult to evaluate the short-term and long-term costs for cloud storage; and the inability to evaluate the cost and time implications for specific data transfers prior to requesting such transfers.

Various embodiments of the invention provide technical solutions that overcome and address the aforementioned technical problems that specifically arise in the realm of computer-based technology, and more specifically, in the realm of data migration technology. These technical solutions constitute improvements to computer technology. In particular, example embodiments of the invention provide improved computer-implemented methods, systems, and non-transitory computer-readable media for managing data migration between different storage devices, tiers, and environments, and which are configured to provide end users with predictive and historical data migration and storage metrics as well as data migration correlation metrics that correlate data migration costs to particular users, departments, job codes, or other custom defined criteria. These various metrics, in turn, enable the end users to properly evaluate their data storage utilization and requirements.

More specifically, example embodiments of the invention provide a data migration/analysis system that implements technical solutions to each of the aforementioned technical problems associated with conventional data mover systems. For instance, a data migration/analysis system in accordance with example embodiments of the invention includes an API engine that is capable of seamlessly integrating with third-party client applications (potentially via API engines local to the client applications) to provide data migration management functionality. In example embodiments, a third-party client application can access the data migration/analysis system via one or more API engines (e.g., an API engine of the third-party client application may communicate with an API engine of the data migration/analysis system), and in particular, can access various GUIs provided by the data migration/analysis system to view historical data storage/data transfer metrics; request predictive data migration metrics for proposed data migrations prior to initiating (and without being required to initiate) the data migrations; initiate data migrations; view the status of pending data migrations; and so forth.

Thus, the API engine implemented by the data migration/analysis system in accordance with example embodiments of the invention—which provides third-party applications with access to functionality of the data migration/analysis system (potentially via respective API engines of the third-party application themselves—provides a technical solution to the technical problem of poor integration with client systems exhibited by existing data movers. Further, the data migration/analysis system according to example embodiments of the invention generates and provides end users with access to predicted data migration metrics associated with proposed data migrations prior to and without requiring the end users to actually initiate the data migrations, which provides a technical solution to the inability of conventional data movers to evaluate the cost and time implications for specific data transfers prior to end users actually requesting the transfers. Still further, the data migration/analysis system according to example embodiments of the invention provides a variety of GUIs via which end users can initiate and manage data migrations in a user-friendly manner as well as access a variety of data storage and data transfer metrics that provide clarity and insight into how cloud storage pricing structures are impacting cloud storage and data migration costs. As such, these technical features solve the technical problems of conventional data movers relating to the absence of a user-friendly interface for initiating data transfers to and from cloud storage and complicated cloud storage pricing structures that make it difficult to evaluate the short-term and long-term costs for cloud storage.

Illustrative Embodiments

FIG. 1A depicts an example networked environment 100A in accordance with example embodiments of the invention. The networked environment 100A includes a data migration/analysis system 106A configured to interact with third-party client applications 112 via an API engine 108. In example embodiments, the third-party client applications 112 may reside and execute, at least in part, on one or more client devices. Such client devices may include, without limitation, personal computers, laptop computers, smartphones, tablet devices, wearable devices, gaming devices, or the like. The third-party client applications 112 may include, for example, applications configured to playback media data; applications configured to facilitate the viewing and/or manipulation of textual data; multimedia data; graphical data; or the like; applications configured to manage data access for one or more other applications (e.g., a media asset management (MAM) application); and so forth. In some example embodiments, the third-party applications 112 may include a web browser, a mobile application, or the like that can be used to access the data migration/analysis system 106A via the API engine 108. More specifically, the third-party client applications 112 may include, without limitation, web browsers, client engines, drivers, user interface components, proprietary interfaces, and so forth. For instance, in example embodiments, a third-party client application 112 may include a local API engine executing, for example, on a same client device as the client application 112 and via which the client application 112 may communicate with the API engine 108 of the data migration/analysis system 106A.

In example embodiments, the third-party client applications 112 may be configured to access the data migration/analysis system 106A via one or more data/communication networks 110 (referred to hereinafter as simply network 110). The network 110 may represent one or more types of computer networks (e.g., a local area network (LAN), a wide area network (WAN), etc.) and/or underlying transmission media. The network 110 may provide communication between 1) the third-party client applications 112, or more specifically, components, engines, datastores, and/or devices that execute the applications 112 and/or on which the applications 112 reside and 2) components, engines, datastores, and/or devices of the data migration/analysis system 106A. In some example embodiments, the data network 110 includes one or more computing devices, routers, cables, buses, and/or other network topologies (e.g., mesh network topologies). In some example embodiments, the data network 110 may include one or more wired and/or wireless networks. In various example embodiments, the data network 110 may include the Internet, one or more WANs, one or more LANs, and/or one or more other public, private, Internet Protocol (IP)-based, and/or non-IP-based networks.

In example embodiments, the data migration/analysis system 106A may be configured to manage data migrations between various storage devices, storage device tiers, storage environments, and the like. As used herein, the term data migration may refer to any movement of data between two storage areas, where a storage area may include a storage device, a storage device tier, a storage environment (e.g., on-premises vs. cloud), or the like, and where the data can be moved from any type of storage device to any type of storage device. Data migration may include copying data from a first storage area to a second storage area such that the data resides in both the first storage area and the second storage area. Alternatively, data migration may include moving data from a first storage area to a second storage area such that the data is deleted from the first storage area. In addition, data migration may include overwriting (i.e., "copying over") data already stored in a repository or retaining the stored data and storing an additional copy of the data.

In example embodiments, the data migration/analysis system 106A may be configured to manage data migration across various on-premises data storage devices/tiers 102(1)-102(N) (collectively referred to herein as on-premises data storage 102). The on-premises data storage 102 may be located at a physical site 120. The data migration/analysis system 106A may be configured to migrate data from one data storage device/tier (e.g., data storage device/tier 102(1)) to another (e.g., data storage device/tier 102(2)). In some example embodiments, the data migration/analysis system 106A may access the on-premises data storage 102 via one or more servers located at the site 120. The on-premises data storage 102 may include data storage devices/storage media have varying storage capacities, data access rates, or the like. Further, in some example embodiments, one on-premises data storage device/tier (e.g., data storage device/tier 102(1)) may store a different type of data than another data storage device/tier (e.g., data storage device/tier 102(2)). The terms data storage device and data storage media or the like may be used interchangeably herein. The term data storage tier may refer to data storage device/media having a particular set of storage characteristics (e.g., storage capacity, data access rates, etc.).

In certain example embodiments, the data migration/analysis system 106A may reside/execute, at least in part, in a cloud computing environment. In such example embodiments, as illustratively depicted in FIG. 1A using broken double arrow lines, the data migration/analysis system 106A may communicate with the on-premises data storage 102 via one or more networks 104 (referred to hereinafter as network 104). The network 104 may include any of the types of networks/transmission media described earlier in relation to the network 110. In other example embodiments, the data migration/analysis system 106A may execute/reside, at least in part, on-premises at the site 120 with the on-premises data storage 102, in which case, the data migration/analysis system 106A may not require a network or may require only a local area network to communicate with at least a portion of the on-premises data storage 102.

In example embodiments, the data migration/analysis system 106A may also be configured to access cloud storage 116 via one or more networks 114 (referred to hereinafter as network 114). The network 114 may include any of the types of networks/transmission media described earlier in relation to the network 110. The data migration/analysis system 106A may be configured to migrate data from the on-premises data storage 102 to the cloud storage 116 and vice versa. Further, the data migration/analysis system 106A may be configured to migrate data between different storage devices/media residing in the cloud storage environment 116.

In some example embodiments, data stored at the on-premises data storage 102 and/or in the cloud storage 116 may be stored in a logical store across one or more physical datastores. In some example embodiments, a logical store may not be assigned to a predetermined datastore but may encompass different physical datastores at different times. In some example embodiments, the data may be stored in one or more data formats according to one or more data schemas. Data formats may include data types; variable types; protocols (e.g., protocols for accessing, storing, and/or transmitting data); programming languages; scripting languages; data value parameters (e.g., date formats, string lengths, etc.); and so forth. In some example embodiments, the data may be stored as data objects as part of an object-oriented data schema. It should be appreciated that the above examples of data schemas, data formats, and the like are merely illustrative and not exhaustive.

Figure 1B:
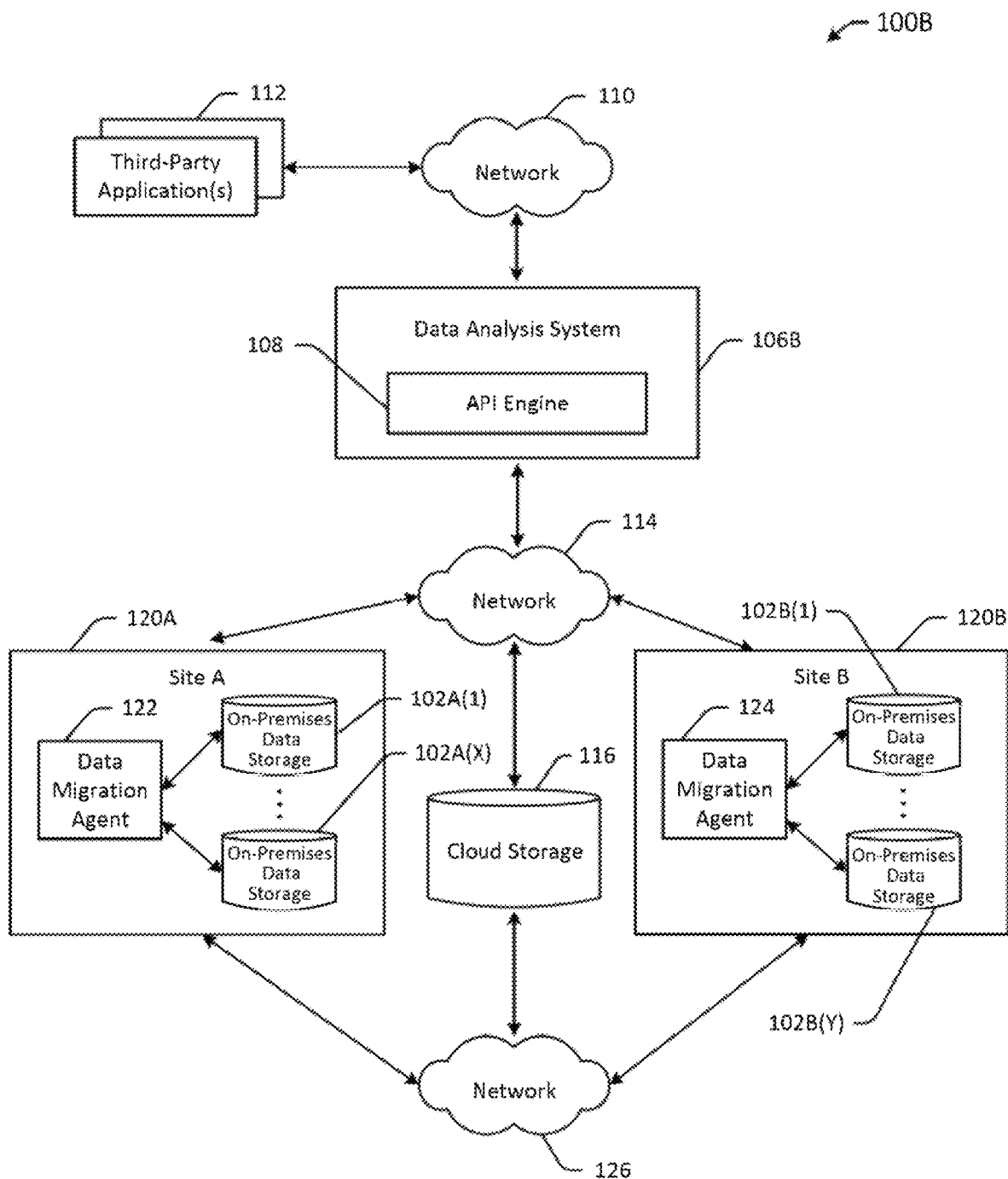
FIG. 1B depicts an alternative example networked environment that includes a data migration/analysis system configured to interact with third-party client applications via one or more API engines and further configured to interact with respective on-site data migration agents which, in turn, are configured to facilitate both on-premises data migrations as well as cloud storage-based migrations in accordance with example embodiments of the invention.

FIG. 1B depicts an alternative example networked environment 100B that includes a data migration/analysis system 106B configured to interact with the third-party client applications 112 via one or more API engines and further configured to interact with respective on-site data migration agents which, in turn, are configured to facilitate both on-premises data migrations as well as cloud storage-based migrations in accordance with example embodiments of the invention. As shown in FIG. 1B, similar to the system 106A, the data analysis system 106B may be configured to communicate with one or more third-party client applications 112 via the network 110. A third-party client application 112 may access the data analysis system 106B via the API engine 108. In some example embodiments, a third-party client application 112 may access the data analysis system 106B (e.g., may communicate with the API engine 108) via a local API engine residing on a client device on which the application is executing such as API engine 120 depicted in FIG. 1A.

In example embodiments, the data analysis system 106B may also communicate with the cloud storage 116 via the network 114. In addition, the data analysis system 106B may communicate with one or more sites via one or more networks. While the data analysis system 106B is illustratively depicted in FIG. 1B as communicating with example sites Site A and Site B via the network 114, it should be appreciated that the data analysis system 106B may communicate with any number of sites via any number of networks. For instance, in some example embodiments, the data analysis system 106B may utilize a respective different network or collection of networks to communicate with each site or with each cluster of sites. Further, the network(s) utilized by the data analysis system 106B to access the sites may be include one or more of the same and/or one or more different networks than the network 114 utilized by the system 106B to access the cloud storage 116.

Each site may include respective on-premises data storage and a respective data migration agent configured to initiate, facilitate, and management data migrations between different on-premises data storage at the site as well as data migrations between on-premises data storage at the site and on-premises data storage at other sites and/or between the on-premises data storage at the site and cloud data storage. For instance, example site 120A includes on-premises data storage 102A(1)-102A(X) (collectively referred to herein as on-premises data storage 102A), where X is any integer greater than or equal to 1, and a data migration agent 122. The example site 120B similarly includes respective on-premises data storage 102B(1)-102B(Y) (collectively referred to herein as on-premises data storage 102B), where Y is any integer greater than or equal to 1, and a data migration agent 124.

In example embodiments, the data migration agent 122 may include any combination of hardware, firmware, and/or software configured to initiate, facilitate, and manage data migrations between different on-premises data storage devices at site A 120A; between on-premises data storage 102A at site A 120A and on-premises data storage at another site (e.g., on-premises data storage 102B); and/or between on-premises data storage 102A at site A 120A and the cloud data 116, which the data migration agent 122 may access via the network 126, which may include any of the types of networks/transmission media previously described. Similarly, in example embodiments, the data migration agent 124 may include any combination of hardware, firmware, and/or software configured to initiate, facilitate, and manage data migrations between different on-premises data storage devices at site B 120B; between on-premises data storage 102B at site B 120B and on-premises data storage at another site (e.g., on-premises data storage 102A); and/or between on-premises data storage 102B at site B 120B and the cloud data 116, which the data migration agent 124 may access via the network 126 or via a different network.

In some example embodiments, the data analysis system 106B may perform data migration analysis tasks (e.g., determining predicted data migration metrics), but may perform only some or none of the data migration functionality capable of being performed by the data migration/analysis system 106A. That is, in the example networked environment 100B, functionality for initiating/managing data migrations may be off-loaded from the system 106B, and may instead be performed by the various data migration agents residing locally at various on-premises sites. In example embodiments, even though the data analysis system 106B may perform no or only limited functions for actually migrating data, the system 106B may nonetheless be configured to access the cloud storage 116 to, for example, determine source/target indices.

Figure 2:
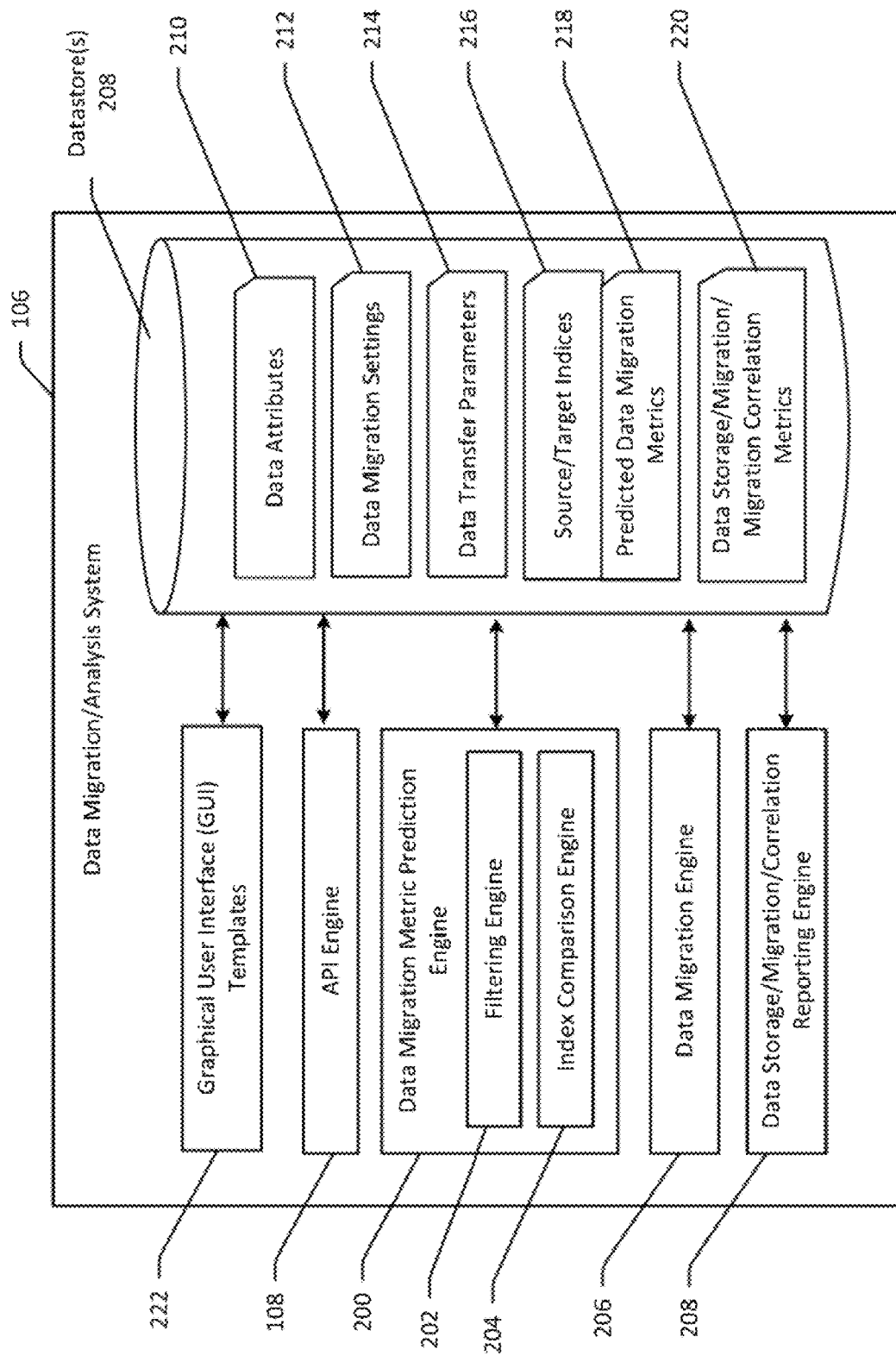
FIG. 2 depicts example components of a data migration/analysis system in accordance with example embodiments of the invention.
Figure 3A:
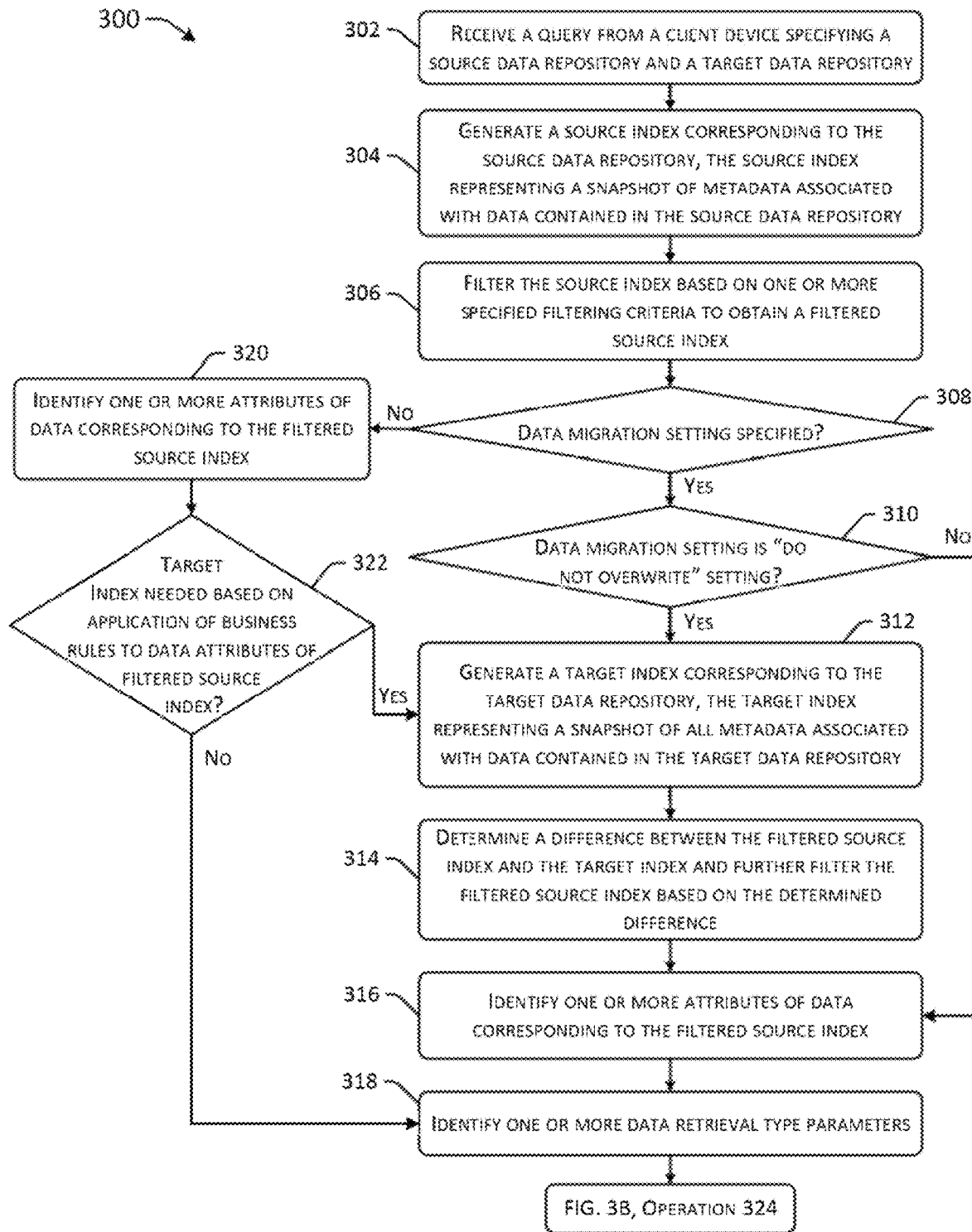
FIGS. 3A-3C depict flowcharts of an illustrative method for predicting data migration metrics in advance of initiating a data migration and presenting the predicted metrics to an end user in accordance with example embodiments of the invention.
Figure 3B:
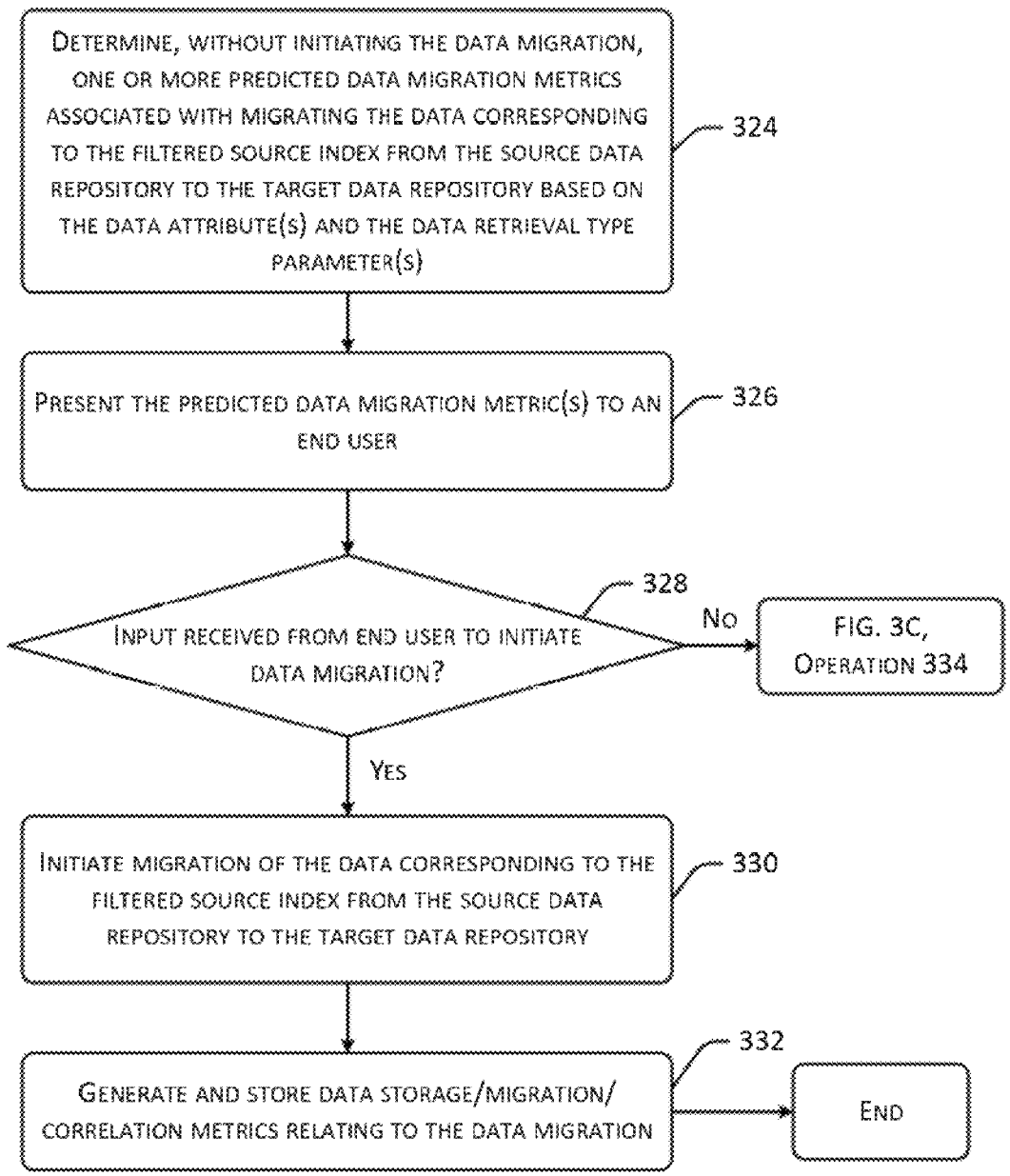
Figure 3C:
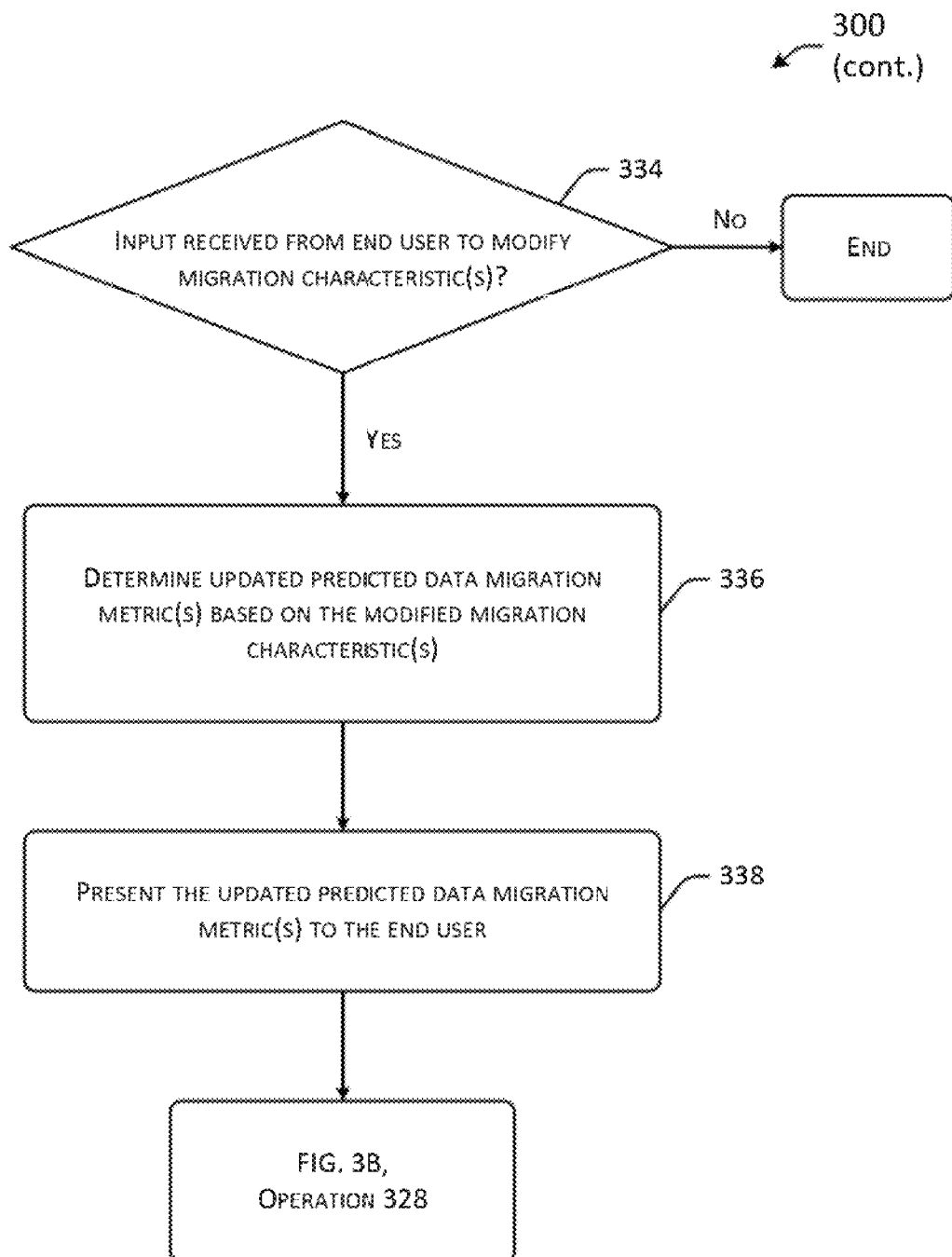
Figure 4:
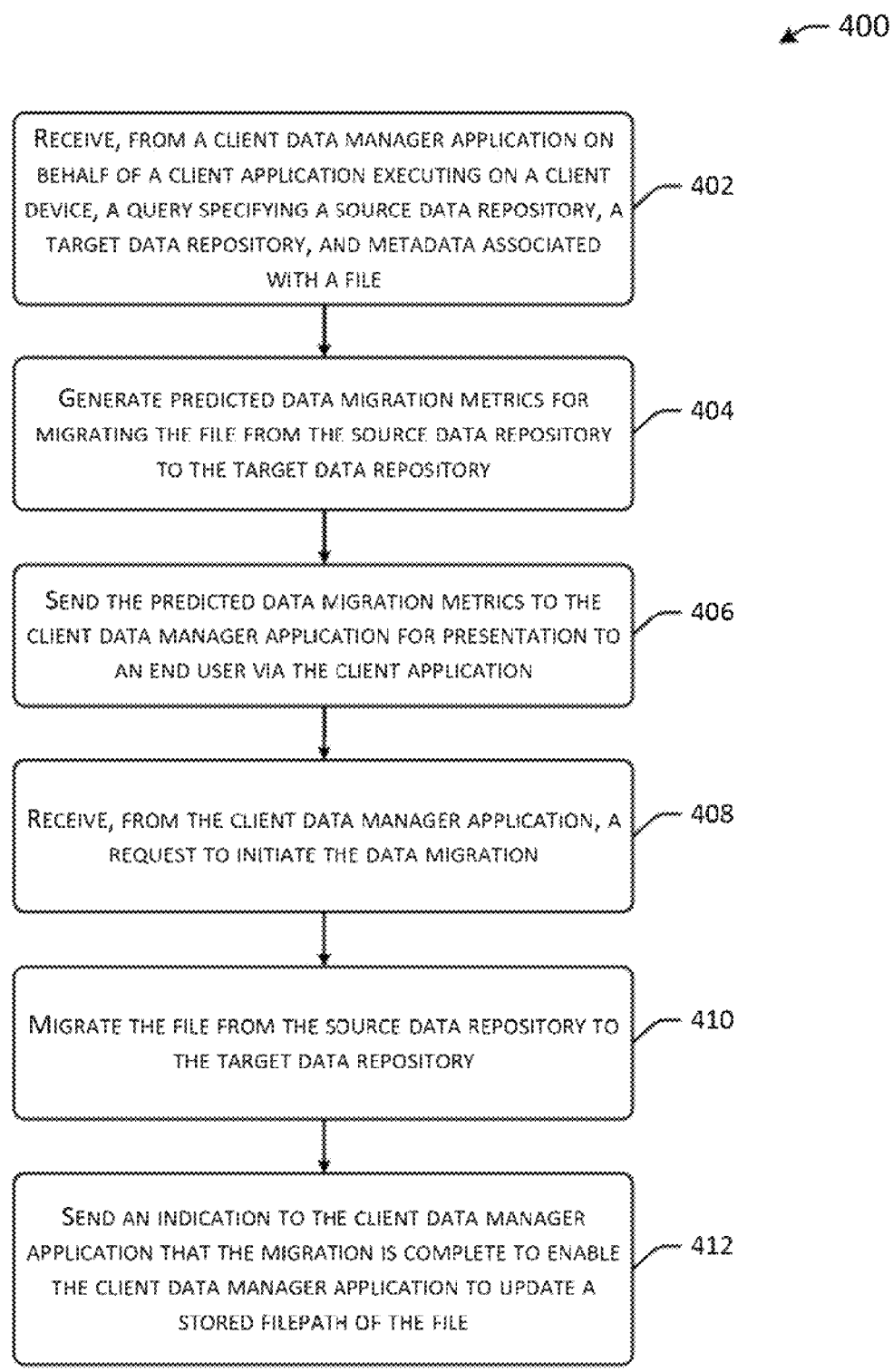
FIG. 4 depicts a flowchart of an illustrative method for receiving a query from a client data manager application relating to a proposed data migration of a file, generating and sending the client data manager application predicted data migration metrics relating to the proposed data migration for presentation to an end user, and initiating the data migration in response to request received via the client data manager application in accordance with example embodiments of the invention.

FIG. 2 depicts example components of the data migration/analysis system 106A in accordance with example embodiments of the invention. FIGS. 3A-3C depict flowcharts of an illustrative method 300 for predicting data migration metrics in advance of initiating a data migration and presenting the predicted metrics to an end user in accordance with example embodiments of the invention. FIG. 4 depicts a flowchart of an illustrative method 400 for receiving a query from a client data manager application relating to a proposed data migration of a file, generating and sending the client data manager application predicted data migration metrics relating to the proposed data migration for presentation to an end user, and initiating the data migration in response to request received via the client data manager application in accordance with example embodiments of the invention. FIGS. 3A-3C and 4 will be described in conjunction with FIG. 2 hereinafter.

It should be appreciated that the data analysis system 106B depicted in FIG. 1B may include one or more of the components of the example implementation of system 106A depicted in FIG. 2 and/or component(s) that provide similar functionality. For example, in some embodiments, some or all of the data migration functionality of system 106A may reside instead on one or more data migration agents located on-site such as in those example embodiments involving system 106B depicted in FIG. 1B. Further, while the example methods 300 and 400 are described hereinafter in reference to an example implementation of the system 106A, it should be appreciated that some or all of the operations of method 300 and/or method 400 may be performed by corresponding components of the system 106B.

Any operation of the method 300 and/or the method 400 described herein can be performed by one or more of the engines depicted in FIG. 2, whose operation will be described in more detail hereinafter. These engines can be implemented in any combination of hardware, software, and/or firmware. In certain example embodiments, one or more of these engines can be implemented, at least in part, as software and/or firmware program modules that include computer-executable instructions that when executed by a processing circuit cause one or more operations to be performed. In example embodiments, these engines may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2, various example components of a particular implementation of the data migration/analysis system 106A are depicted. As previously described, the data migration/analysis system 106A may include the API engine 108, via which third-party client applications may access functionality of the data migration/analysis system 106A. The data migration/analysis system 106A may further includes a data migration metric prediction engine 200, which in turn, may include various sub-engines including a filtering engine 202 and an index comparison engine 204. The data migration/analysis system 106A may further include a data migration engine 206 and a data storage/migration/correlation metrics reporting engine 208. The data migration/analysis system 106A may further include one or more datastores 208 storing various types of data, which will be described in more detail in reference to the example method 300 depicted in FIGS. 3A-3C.

In example embodiments, the data migration metric prediction engine 200 may include computer-executable instructions that, responsive to execution by one or more processors, may cause operations to be performed to generate one or more predicted data migration metrics. As will be described in more detail later in this disclosure, the data migration metric prediction engine 200 may determine a cost, a duration for completion, etc. associated with a data migration of data from a source data repository to a target data repository without having to initiate or perform the data migration. This may be referred to herein as a "dry run" data migration. The data migration metric prediction engine 200 may determine the predicted data migration metrics associated with a "dry run" data migration based on attributes (e.g., data size, number of files, etc.) of the data selected for the proposed data migration, a selected data retrieval type option, characteristics/attributes of the source data repository and/or the target data repository, and so forth.

In example embodiments, the filtering engine 202 may include computer-executable instructions that, when executed by one or more processors, cause operations to be performed to filter a source index based on one or more filtering criteria. The source index may represent a snapshot of metadata associated with data stored in a specified source data repository at a particular point in time. In example embodiments, an end user desiring the predicted data migration metrics for a particular proposed data migration may specify various filtering criteria (e.g., file type, filename, file size, etc.), based on which, the filtering engine 202 may filter down the metadata in the source index to a subset of the metadata that satisfies the filtering criteria. For example, the filtering engine 202 may filter out from the source index any files that do not match the specified file type, leaving only those files that match the specified file type. Similarly, the filtering engine 202 may filter out from the source index any files that do not match at least a portion of the specified filename (or exactly match the specified filename), leaving only those files that match the specified filename (either exactly or partially). As yet another non-limiting example, the filtering engine 202 may filter out from the source index any files above a threshold file size (or below a threshold file size), leaving only those files that satisfy a specified threshold file size requirement.

In example embodiments, the index comparison engine 204 may include computer-executable instructions that, when executed by one or more processors, cause operations to be performed to determine if a target index is required in order to generate the predicted data migration metrics, and if so, determine a difference between a filtered source index and a target index. A target index may represent a snapshot of metadata associated with data contained in the target data repository at a particular point in time. A target index may be required, for example, if an end user has selected a data migration setting that calls for not migrating any duplicate files from the source data repository that are already present in the target data repository. A target index may also be required even if a data migration setting is not specified such as, for example, if a number of files selected for the proposed migration (e.g., a number of files in the filtered source index) is greater than a threshold number of files. The index comparison engine 204 may be configured to determine a delta between the filtered source index and the target index and further filter the filtered source index to remove any files from the filtered source index that are determined, from the target index, to already be stored at the target data repository. In this manner, the size of the proposed data migration may be reduced, and thus, the corresponding predicted cost and prediction duration to complete the data migration may be reduced.

In example embodiments, the data migration engine 206 may include computer-executable instructions that, when executed by one or more processors, may cause operations to be performed to initiate, monitor, and complete a data migration. For instance, in some example embodiments, an end user may decide to proceed with a data migration after being presented with the corresponding predicted data migration metrics. Based on user input indicating a selection to proceed with a proposed data migration, the data migration engine 206 may initiate and monitor the progress of the data migration from the source data repository to the target data repository.

In example embodiments, the data storage/migration/correlation metrics reporting engine 208 may generate, store, retrieve, aggregate, sort, filter, and so forth various data storage and data transfer metrics relating to currently pending data migrations and/or completed data migrations. Such metrics may include, for example, an amount of data egress from cloud storage over a specified period of time, an amount of data ingress to cloud storage over a specified period of time, an amount of data stored across different storage tiers, various cost metrics associated with data storage and/or completed data migrations, various cost metrics correlated to particular users, departments, job codes, or other client custom specified entities, and so forth. As will be described in more detail later in this disclosure, an end user may access various GUIs that present the aforementioned metrics and other metrics in various formats.

Referring now to FIG. 3A in conjunction with FIG. 2, at block 302 of the method 300, the data migration/analysis system 106A may receive a query from a client device. In example embodiments, the query may be received from a third-party client application 112 executing on a client device, and the application 112 may access the data migration/analysis system 106A via the API engine 108. In example embodiments, the query may specify a source data repository and a target data repository corresponding to a proposed migration of data from the source data repository to the target data repository. The source data repository may be on-premises data storage or cloud storage. Similarly, the target data repository may be on-premises data storage or cloud storage. The source data repository and target data repository may be on-premises data storage at a same site (e.g., different data storage tiers) or at different sites.

Figure 6:
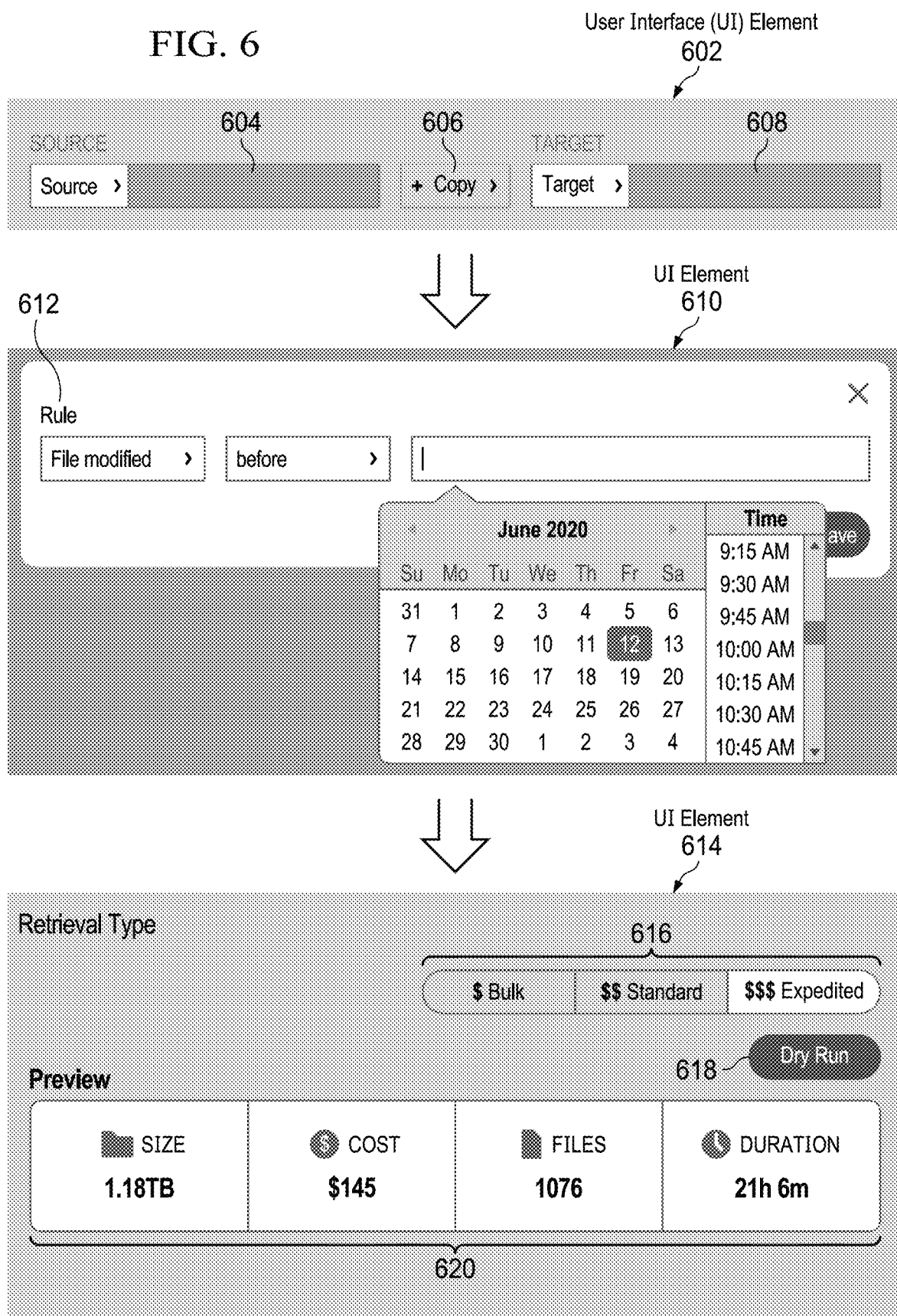
FIG. 6 depicts an example GUI via which various parameters of a proposed data migration can be specified as part of a request to generate predicted metrics for the proposed data migration in accordance with example embodiments of the invention.

In some example embodiments, the data migration/analysis system 106A may be a web-based/web-accessible system, and the application 112 from which the query is received may be a web browser or the like executing on the client device. Referring to FIG. 6, an example UI element 602 is depicted that includes a field 604 in which an end user may specify a source data repository and a field 608 in which the end user may specify a target data repository. The UI element 602 may form part of a web-based interface of the data migration/analysis system 106A.

At block 304 of the method 300, the data migration/analysis system 106A may generate a source index corresponding to the source data repository. In example embodiments, the source index may represent a snapshot of metadata associated with data contained in the source data repository. In example embodiments, the data migration/analysis system 106A may generate the source index by accessing the source data repository, which may be on-premises data storage potentially accessed via a data migration agent residing at the site or which may be cloud storage. In other example embodiments, the source index corresponding to the source data repository may be maintained at the client device and may be provided in connection with the query received at block 302. In example embodiments, the source index received at block 304 may be transiently stored on the data migration/analysis system 106A as part of data 216 in the datastore(s) 208. That is, in some example embodiments, the source index may be deleted from the data migration/analysis system 106A after predicted data migration metrics are determined and/or after the corresponding data migration is initiated (if so requested by the end user). The source index may only be transiently maintained because the data contained at the source data repository may be constantly changing, and thus, the corresponding metadata for that data (which the source index represents) may be constantly changing as well.

At block 306 of the method 300, the filtering engine 202 may filter the source index based on one or more specified filtering criteria to obtain a filtered source index. In example embodiments, the filtering criteria may relate to one or more characteristics of data stored in the source data repository such as file type, filename, file size, file modification characteristics, etc. In example embodiments, the filtering engine 202 may filter down the dataset corresponding to the source index to a subset of data that satisfies the filtering criteria. For example, the filtering engine 202 may filter out from the source index any files that do not match a specified file type, leaving only those files that match the specified file type. Similarly, the filtering engine 202 may filter out from the source index any files that do not match at least a portion of the specified filename (or exactly match the specified filename), leaving only those files that match the specified filename (either exactly or partially). As yet another non-limiting example, the filtering engine 202 may filter out from the source index any files above a threshold file size (or below a threshold file size), leaving only those files that satisfy a specified threshold file size requirement. Referring to FIG. 6, in example embodiments, an end user may select various filtering criteria 612 via a UI element 610. In FIG. 6, the example filtering criterion depicted calls for filtering down the source index to only those files modified before a specified date.

Referring again to FIG. 3A in conjunction with FIG. 2, at block 308 of the method 300, the data migration metric prediction engine 200 may determine whether a data migration setting has been specified by an end user. For instance, referring to FIG. 6, an end user may specify a data migration setting 212 via a field 606 of the UI element 602. The example data migration setting 212 in FIG. 6 is to "copy" files that satisfy the specified filtering criteria, which may indicate that a copy of any file migrated from the source data repository to the target data repository in connection with the current query should be retained in the source data repository. An alternative data migration setting 212 may specify that files that satisfy the specified filtering criteria should be "moved," which may indicate that a copy of any file transferred from the source data repository to the target data repository should not be retained in the source data repository.

In example embodiments, certain data migration settings may indicate whether a target index representing a snapshot of metadata associated with data contained in the target data repository is needed in order to perform a "dry run" and determine the predicted data migration metrics. In example embodiments, responsive to a positive determination at block 308, the method 300 may proceed to block 310, where the data migration metric prediction engine 200 may determine whether a "do not overwrite" data migration setting has been specified. For instance, a data migration setting may indicate that files migrated from the source data repository to the target data repository are to overwrite any existing duplicate files already stored in the target data repository (an "overwrite data migration setting) or that only those files in the filtered source index for which there is no corresponding duplicate existing file in the target data repository are to be migrated (a "do not overwrite" data migration setting).

In response to a positive determination at block 310 indicating that a "do not overwrite" data migration setting has been specified, the method 300 may proceed to block 312, where the data migration metric prediction engine 200 may generate a target index corresponding to the target data repository from the client device. The target index may represent a current snapshot of metadata associated with data contained in the target data repository. In example embodiments, the data migration/analysis system 106A may store the target index transiently as part of data 216 until the predicted data migration metrics are determined and/or until the data migration is initiated or completed, if the end user decides to proceed with the data migration. In other example embodiments, the target index may be maintained and received from a client device.

At block 314 of the method 300, the index comparison engine 204 may compare the filtered source index to the target index to determine a difference (a delta) between the two. In particular, the index comparison engine 204 may identify each file in the filtered source index that is already present in the target data repository. The filtering engine 202 may then filter out any such file from the filtered source index to obtain a further filtered source index. Each file in this additionally filtered source index may then be a file to be migrated to the target data repository for which there is no existing duplicate file in the target data repository. In some example embodiments, the index comparison engine 204 may take into account that date/time that a duplicate file in the target data repository was last modified or migrated over from the source data repository in determining whether to filter such a file out from the filtered source index. For example, if a duplicate to a file in the filtered source index exists in the target data repository, but more than a threshold period of time has elapsed since the file was migrated over to the target data repository or more than a threshold period of time has elapsed since the file was last accessed or modified, the index comparison engine 204 may not flag any such file for exclusion from the filtered source index. Alternatively, the filtering engine 202 may know to retain any such file in the filtered source index based on a flag assigned to the file by the index comparison engine 204.

From block 314, the method 300 may proceed to block 316, where the data migration metric prediction engine 200 may determine one or more attributes of data corresponding to the filtered source index. For example, the data migration metric prediction engine 200 may identify a number of discrete files identified in the filtered source index. As another non-limiting example, the engine 200 may identify an aggregate file size of the files identified in the filtered source index. Because the filtered source index contains metadata identifying that portion of the data that satisfies the specified filtering criteria, the number of files identified in the filtered source index and the aggregate size of such files may be less than what it may be for all data in the source data repository.

From block 316, the method 300 may proceed to block 318, where one or more data retrieval type parameters may be specified. The method 300 may also arrive at block 318 via a different process flow. For instance, responsive to a negative determination at block 308, the method 300 may proceed to block 320, where the data migration metric prediction engine 200 may determine data attributes of data corresponding to the filtered source index. The data attributes identified at block 320 may include any of those previously described including, without limitation, a number of discrete files identified in the filtered source index, an aggregate file size of the files identified in the filtered source index, etc.

At block 322 of the method 300, the data migration metric prediction engine 200 may determine whether a target index is needed based on an application of business rules to data attributes of data corresponding to the filtered source index. For instance, in certain example embodiments, even if a data migration setting is not explicitly specified, business rules may require that a target index nonetheless be generated and used if application of the business rules to the attributes of the data corresponding to the filtered source index so dictate. Such business rules may, for example, require a target index for a proposed data migration of more than a threshold number of files, more than an aggregate file size, or where one or more files to be migrated exceed the threshold individual file size, while a proposed data migration of less than the threshold number of files, less than the aggregate file size, or where no files or less than a threshold number of files to be migrated exceed the individual threshold file size may not require the target index. In this manner, even if not specified as a data migration setting, file overwriting may be permitted when only a small number of files and/or files with low file sizes are being migrated because the reduction in the duration of the data migration achieved by identifying duplicative files and removing them from the filtered source index may be minimal in such scenarios.

If application of the business rules to the data attributes of the data corresponding to the filtered source index indicates that a target index is needed, then a positive determination is made at block 322, and the method proceeds to block 312, where the target index is generated. On the other hand, if application of the business rules to the data attributes of the data corresponding to the filtered source index indicates that a target index is not needed, then a negative determination is made at block 322, and the method proceeds to block 318, and no target index is generated.

At block 318 of the method 300, the data migration metric prediction engine 200 may identify one or more data retrieval type parameters 214 associated with the query. Referring to FIG. 6, in example embodiments, various data retrieval type options 616 may be presented to an end user via a UI element 614. The data retrieval type options may correspond to different retrieval times corresponding a time period between when data is accessed and when it becomes ready for migration. In FIG. 6, three different data retrieval type options 616 are illustratively depicted. The cost of a data retrieval type option may be inversely correlated with the data retrieval time. Thus, as a data retrieval type option becomes faster (i.e., the time period between data access and data readiness for migration is reduced), the cost of that option may go up.

Referring now to FIG. 3B, at block 324 of the method 300, the data migration metric prediction engine 200 may determine, without actually initiating the data migration proposed by the query, one or more predicted data migration metrics 218 associated with a data migration of the data corresponding to the filtered source index from the source data repository to the target data repository. In those example embodiments in which a target index corresponding to the target data repository was received, the engine 200 may determine the predicted data migration metrics 218 associated with migrating data from the source data repository to the target data repository that corresponds to the difference between the filtered source index and the target index. Then, at block 326 of the method 300, the data migration/analysis engine 106A may cause the predicted data migration metrics to be presented to the end user via a GUI.

In certain example embodiments, as shown in FIG. 6, the engine 200 may initiate the "dry run" determination at block 324 responsive to receiving a user selection of a widget 618 provided in the UI element 614. As illustratively shown in FIG. 6, preview information 620 corresponding the proposed data migration (i.e., the "dry run") may include predicted data migration metrics 218 such as a predicted cost for migrating the data and a predicted duration of time to complete the migration. The preview information 620 may further include an identification of the number of files to be migrated and the aggregate file size of the files.

In example embodiments, the engine 200 may determine the predicted cost metric based on any combination of the number of files to be migrated, the aggregate file size of the files, the individual file size of any given file, the type of storage tier from which the data is being sourced (the source data repository), and/or the type of storage tier to which the data is to be migrated (the target data repository). In some example embodiments, the engine 200 may consult a predetermined pricing structure to determine the predicted cost. In other example embodiments, the customer represented by the end user may have established a custom pricing schedule with the service provider entity who owns/operates the data migration/analysis system 106A. In example embodiments, the pricing structure may define a cost per unit of data transferred (e.g., cost per megabyte (MB), cost per gigabyte (GB), cost per terabyte (TB), etc.). In other example embodiments, the pricing structure may define a cost based on aggregate file size. For instance, the pricing structure may associate different costs with different ranges of aggregate file sizes. Further, in some example embodiments, the pricing structure may offer special incentives such as discounts for a transfer with an aggregate file size below a threshold value or a transfer in which no file exceeds a threshold file size. Conversely, the pricing structure may penalize migrations where the aggregate file size exceeds a threshold value or where one or more (or some threshold number) of individual files exceeds a threshold file size. In example embodiments, the engine 200 may determine the predicted duration for completing the data migration based on a strength of a network connection between the source data repository and the target data repository, an instantaneous or average data transfer rate (e.g., a bit rate) associated with the network connection, or the like.

At block 328 of the method 300, the data migration/analysis system 106A may determine whether input is received from the end user at a corresponding GUI to initiate the data migration. For instance, after being presented with the predicted data migration metrics, the end user may elect to provide such input via selection of a widget, button, or the like on a GUI. The GUI may be a same GUI that contains UI elements 602, 610, and/or 614 of FIG. 6 or a different GUI. On the other hand, after reviewing the predicted data migration metrics, the end user may elect not to initiate the data migration. For example, the end user may determine that the estimated cost is too high or the duration too long.

In response to a negative determination at block 328 indicating that the end user has elected not to pursue the proposed data migration, the method 300 may proceed to block 334. Referring now to FIG. 3C, the data migration/analysis system 106A may determine, at block 334, whether any input has been received from the end user modifying one or more characteristics of the proposed data migration. For example, the end user may modify the source data repository, the target data repository, the filtering criteria, the selected data retrieval type option, or the like in an effort to reduce costs and duration of the migration. In response to a negative determination at block 334, the method 300 may end. On the other hand, in response to a positive determination at block 334, the data migration metric prediction engine 200 may determine, at block 336 of the method 300, updated predicted data migration metrics based on the modified migration characteristic(s), and may present the updated predicted data migration metrics to the end user at block 338 of the method 300. From block 338, the method 300 may again proceed from block 328.

Referring again to block 328 of the method 300, if, on the other hand, the end user provides input indicating a selection to initiate the data migration, the data migration engine 206 may initiate data migration at block 330 of the method 300. More specifically, the data migration engine 206 may initiate the migration of the data corresponding to the filtered source index from the source data repository to the target data repository. In those example embodiments in which a target index was received, the data corresponding to the difference between the filtered source index and the target index may be migrated from the source repository to the target repository.

Figure 7:
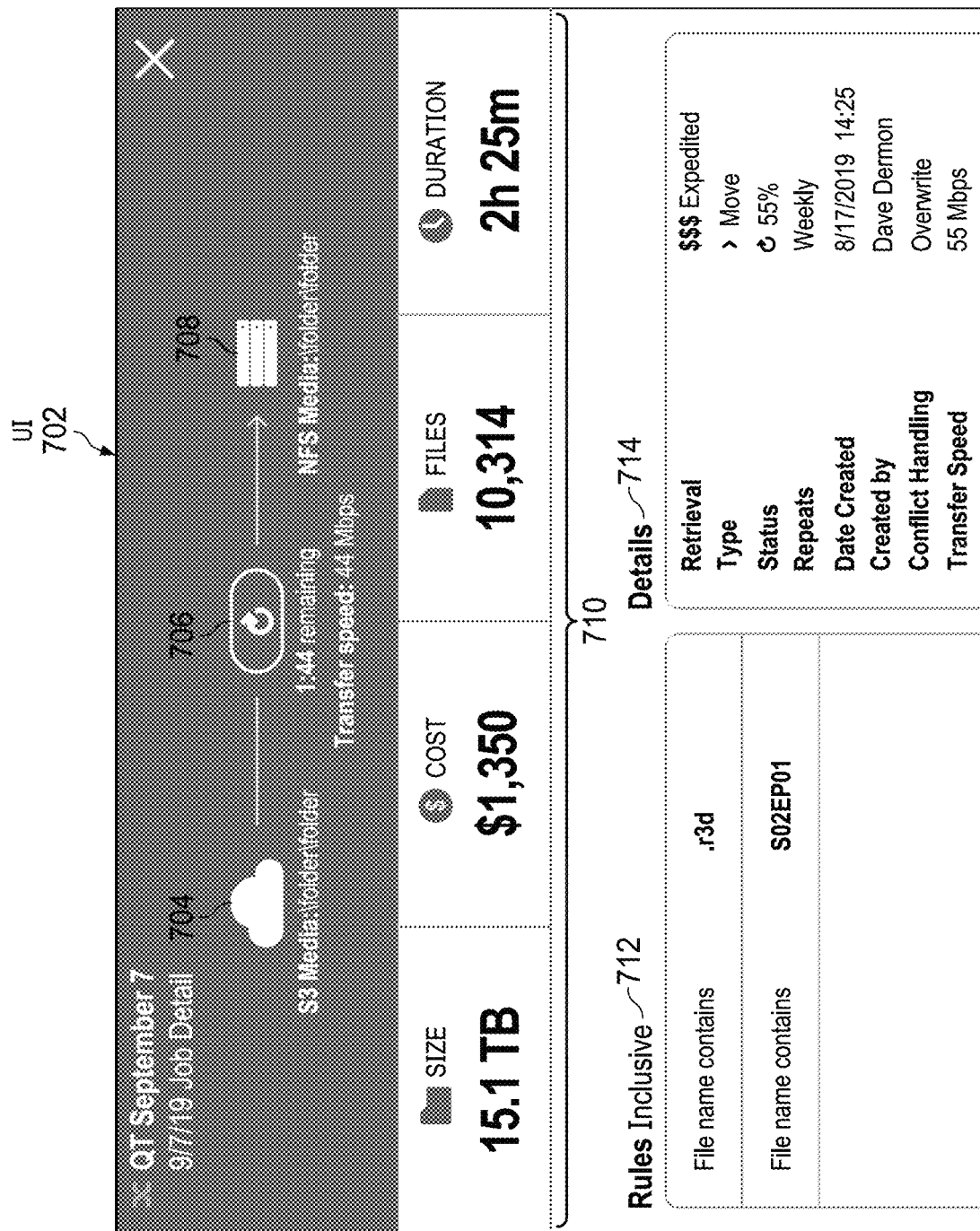
FIG. 7 depicts an example GUI presenting various predicted data migration metrics in accordance with example embodiments of the invention.

At block 332 of the method 300, the data storage/migration/correlation metrics reporting engine 208 may generate and store data storage/migration/migration correlation metrics 220 corresponding to the data migration. In some example embodiments, the engine 208 may present an indication of the metrics in real-time to the end user as the data migration is pending. For instance, as depicted in FIG. 7, a GUI 702 may be generated that includes various information associated with the ongoing data migration. Such information may include an indication 704 of the source data repository, an indication 708 of the target data repository, and an indication 706 of the amount of time remaining to complete the data migration and the instantaneous or average transfer rate. The GUI 702 may further present various data storage/migration/migration correlation metrics 710 such as the aggregate file size of the files being migrated, the total number of files being migrated, the total cost associated with the data migration, and the overall duration of the migration. In some example embodiments, some of the metrics may differ slightly from the predicted data migration metrics. For example, the duration metric may differ based on differences between actual characteristics of the network connection and the predicted characteristics of the network connection. In addition, the cost may vary slightly from the predicted cost if, for example, migration of one or more files fails. The GUI 702 may further provide an indication 712 of the filtering criteria associated with the data migration as well as additional detailed information 714 associated with the data migration such as selected data retrieval type option, type of data migration (e.g., move vs. copy), selected frequency of the data migration, how data file conflicts are to be handled (e.g., overwrite or exclude duplicates), and so forth. It should be appreciated that any of the GUIs, or more generally, any of the UIs depicted in the Figures and/or described herein may be generated by populating corresponding GUI templates 222 stored in the datastore(s) 208 (FIG. 2) with the appropriate corresponding information.

FIG. 4 depicts a flowchart of an illustrative method 400 for receiving a query from a client data manager application relating to a proposed data migration of a file, generating and sending the client data manager application predicted data migration metrics relating to the proposed data migration for presentation to an end user, and initiating the data migration in response to request received via the client data manager application in accordance with example embodiments of the invention.

At block 402 of the method 400, the data migration/analysis system 106A may receive, from a client data manager application on behalf of a client application executing on a client device, a query that specifies a source data repository, a target data repository, and metadata associated with a file. The client data manager application may be, for example, a MAM application or the like. The client application may be any application (e.g., a media player application, an application for modifying/manipulating media or graphics files, etc.) which may rely on the client data manager application to manage the storage and retrieval of data used by the application. In an example embodiment, the client data manager application may correspond to an application 112 that accesses the data migration/analysis system 106A via the API engine 108 (FIG. 1). In an example embodiment, an end user may initiate the query from within the client application, which may be relayed to the data migration/analysis system 106A by the client data manager application.

At block 404 of the method 400, the data migration metric prediction engine 200 may generate predicted data migration metrics for migrating the file from the specified source data repository to the specified target data repository. In example embodiments, the engine 200 may determine the predicted data migration metrics based on the received file metadata. The file metadata may include, for example, a file type, a file size, or the like. In some example embodiments, the engine 200 may further determine the predicted data migration metrics based on a type of storage tier of the source data repository and/or the target data repository.

At block 406 of the method 400, the data migration/analysis system 106A may send the predicted data migration metrics to the client data manager application for presentation to an end user via the client application. As previously noted, the predicted data migration metrics may include a predicted cost for the file transfer, a prediction duration for completion of the file transfer, or the like.

At block 408 of the method 400, the data migration/analysis system 106A may receive a request to initiate the data migration from the client data manager application. The request may be received responsive to user input provided by an end user to the client application, which may be relayed to the system 106A via the client data manager application.

At block 410 of the method 400, the system 106A may migrate the file from the source data repository to the target data repository. Further, the system 106A may generate and store data storage/transfer metrics corresponding to the data migration. Finally, at block 412 of the method 400, the system 106A may send an indication that the file migration was successfully completed to the client data manager application. This enables the client data manager application to update a stored filepath for the migrated file such that the file will be retrievable in response to future requests for the file from client applications.

Figure 5:
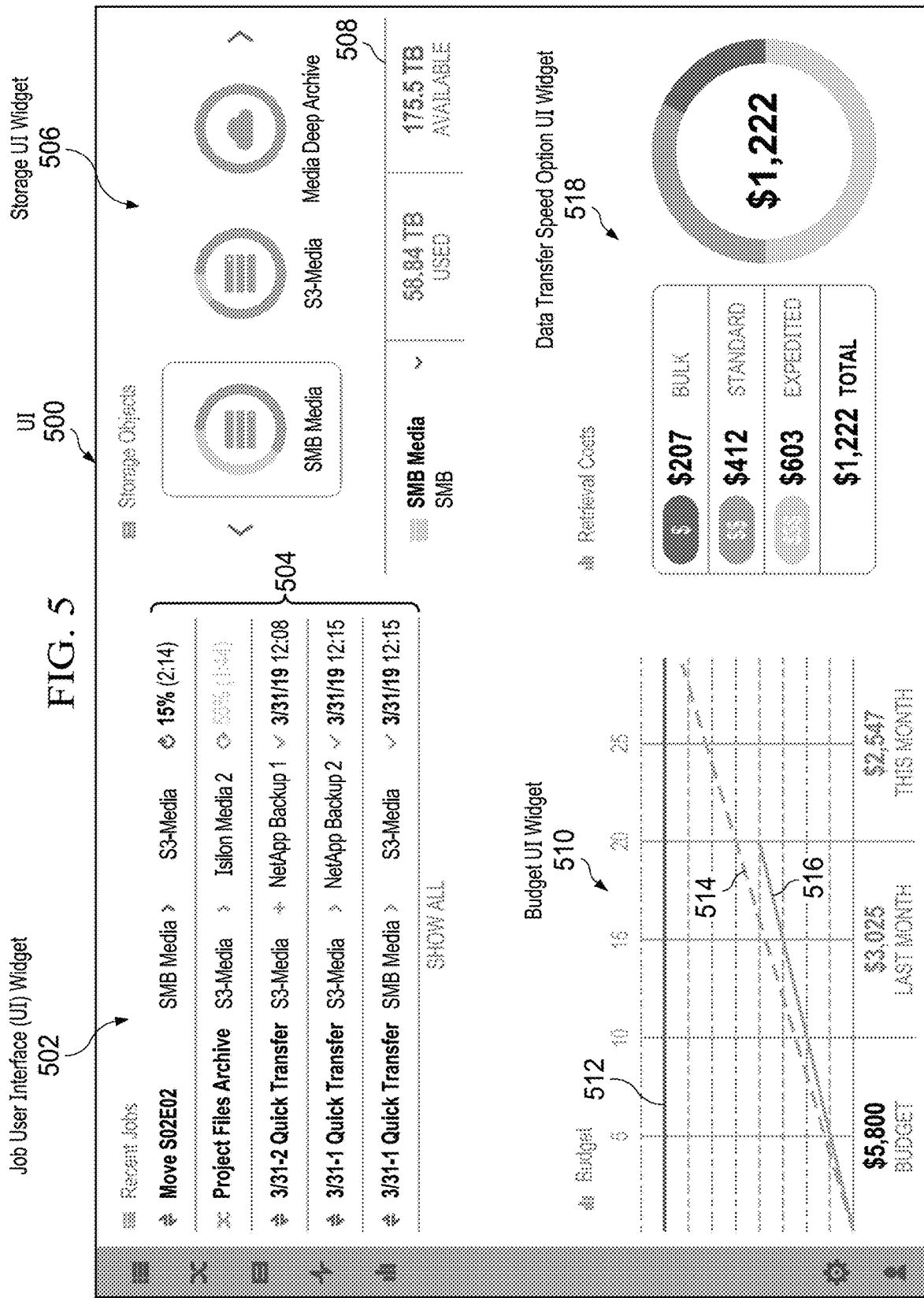
FIG. 5 depicts an example graphical user interface (GUI) that includes various user interface (UI) widgets for presenting various types of data storage/data transfer metrics in accordance with example embodiments of the invention.

FIG. 5 depicts an example GUI 500 that includes various UI widgets for presenting various types of data storage/data transfer metrics in accordance with example embodiments of the invention. As shown in FIG. 5, the GUI 500 may include a jobs UI widget 502 that provides a listing of various data migration jobs, some of which may be completed and some of which may be still pending. The UI widget 502 may further present various information for each data migration job such as whether the job is an ingress migration to cloud storage or an egress migration from cloud storage; whether the job is a migration between two on-premises storage tiers; an indication of the source and target data repositories; completion date/time of the migration, or if still pending, percent completed; and so forth.

The GUI 500 may additionally include a storage UI widget 506 that may provide a snapshot view of each storage device/storage tier as well as amount of each storage unit that has been used and an amount that is available for use. The GUI 500 may further include a budget UI widget 510 that may indicate a budget for storage/data transfer expenses with respect to a specified period of time (e.g., monthly). The budget UI widget 510 may further indicate how costs are trending towards the budget and how costs compare between a current time period and a previous time period (e.g., current month vs. previous month). In addition, the GUI 500 may include a data retrieval type option UI widget 518 that provides a breakdown of total costs incurred for each retrieval type.

Figure 8:
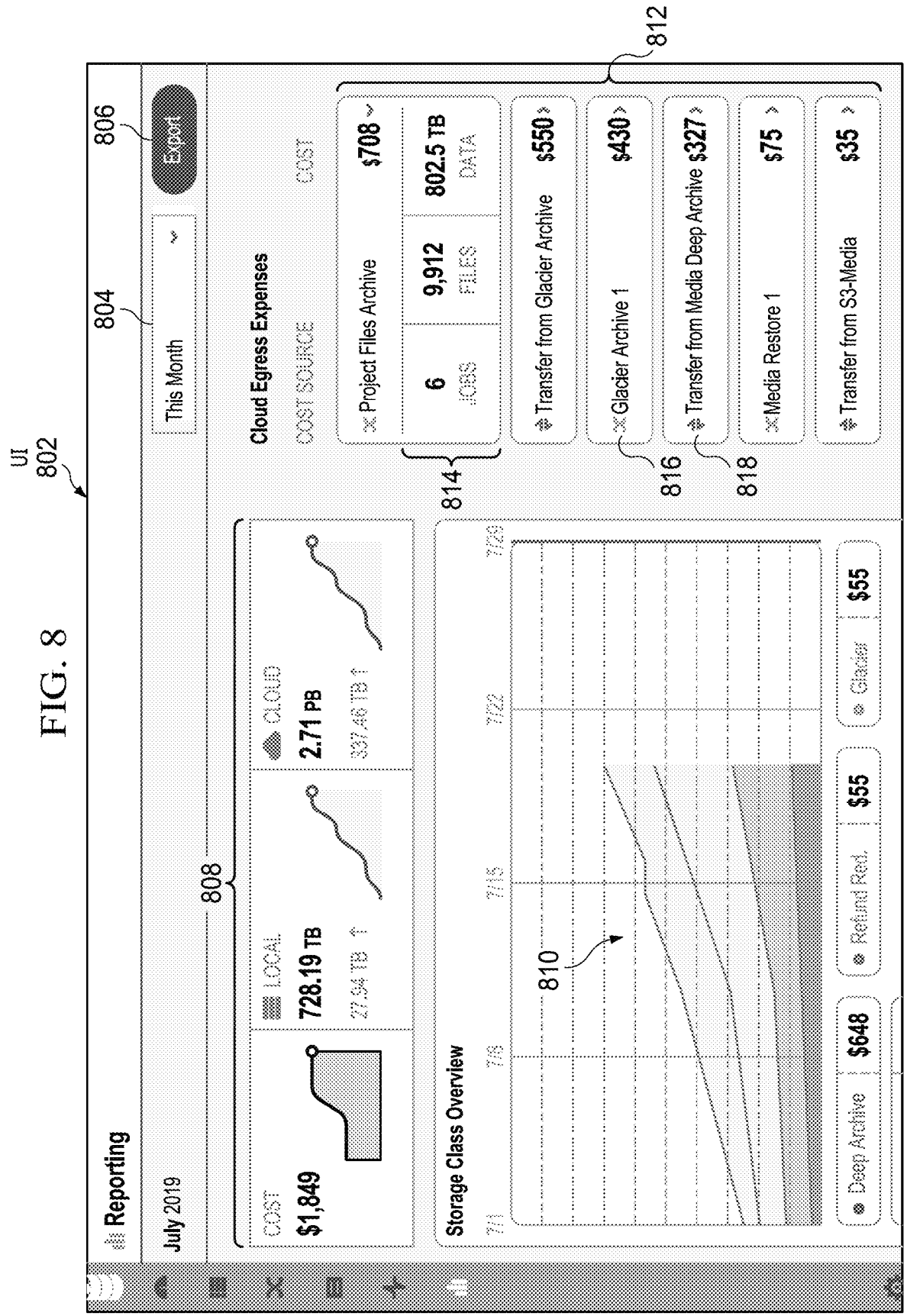
FIG. 8 depicts an example GUI depicting metrics relating to local data storage and data storage and retrieval from a cloud storage environment in accordance with example embodiments of the invention.

FIG. 8 depicts an example GUI 802 depicting metrics relating to local data storage and data storage and retrieval from a cloud storage environment in accordance with example embodiments of the invention. The GUI 802 may include a selectable option 804 (e.g., a drop-down field) for selecting a timeframe over which the reporting metrics are desired. The GUI 802 may further includes a button 806, control, or the like that may be selectable to export the metrics data to a designated file format or a local application running on a client device. The GUI 802 may indicate various storage metrics 808 including a total amount of data being stored on-premises, a total amount of data being stored in the cloud environment, and a total storage cost. The GUI 802 may further provide a graphical depiction 810 of the different storage classes/tiers being used and respective costs associated therewith. In addition, the GUI 802 may provide cost metrics 812 for each cloud storage tier. Selection of a particular cloud storage tier on the GUI 802 may result in an expanded view 814 being presented that provides more detail for the selected tier such as number of data migration jobs involving the selected cloud storage tier (e.g., number of ingress or egress migrations to/from the selected cloud storage tier), number of migrated files, total amount of migrated data, and so forth. In example embodiments, the UI 802 may include different icons to represent different cloud egress types. For example, a first icon 816 may indicate that costs are being provided for periodically scheduled data migrations and/or migrations that are triggered based on one or more criteria being satisfied. Another icon 818 may be indicate that costs are being provided for a one-off end user selected data migration.

Figure 9:
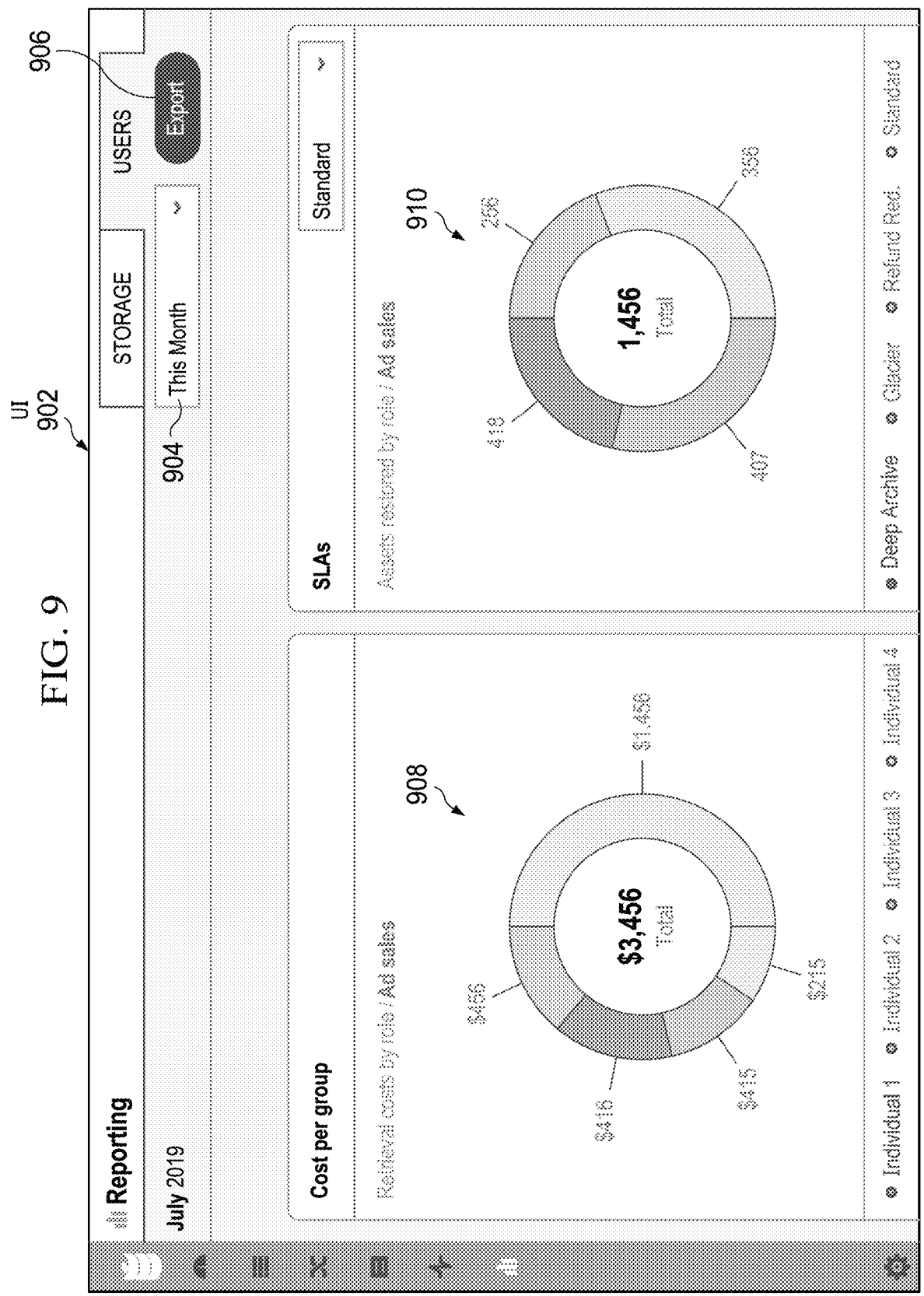
FIG. 9 depicts an example GUI depicting data storage metrics for different customer entities and data storage tiers in accordance with example embodiments of the invention.

FIG. 9 depicts an example GUI 902 depicting data storage metrics for different customer entities and data storage tiers in accordance with example embodiments of the invention. Similar to the GUI 802, the GUI 902 may include a selectable option 904 (e.g., a drop-down field) for selecting a timeframe over which the reporting metrics are desired. The GUI 802 may further includes a button 906, control, or the like that may be selectable to export the reporting metrics data to a designated file format or a local application running on a client device. GUI 902 may include a widget 908 that provides a cost breakdown for data retrievals from cloud storage initiated by each department or by each individual end user. The GUI 902 may further include a widget 910 that provides a breakdown (for each department or individual end user) of data migrations initiated to cloud storage for each type of cloud storage tier. The information in the GUI 902 is generated by the data migration/analysis 106A (or the system 106B) based on migration metrics that are correlated to specific entities such as specific individuals, departments, job codes, or other client custom specified criteria.

FIG. 10 depicts an example GUI 1002 listing various data migration jobs and corresponding metrics in accordance with example embodiments of the invention. The GUI 1002 may include a button 1004, control, or the like that is selectable to initiate a new data migration. The GUI 1002 may further include a search field 1006 for searching for a particular data migration job. As previously noted, the GUI 1002 may provide a listing 1010 of data migration jobs as well as various information 1008 related to each job such as an initiator of the job, a source data repository, a target data repository, a cost of the data migration, an aggregate size of the data being migrated, a data retrieval type, a duration of the migration, a time/datestamp of initiation of the migration, and a current status of the migration (e.g., completed or pending, and if pending, percent completed).

Figure 11:
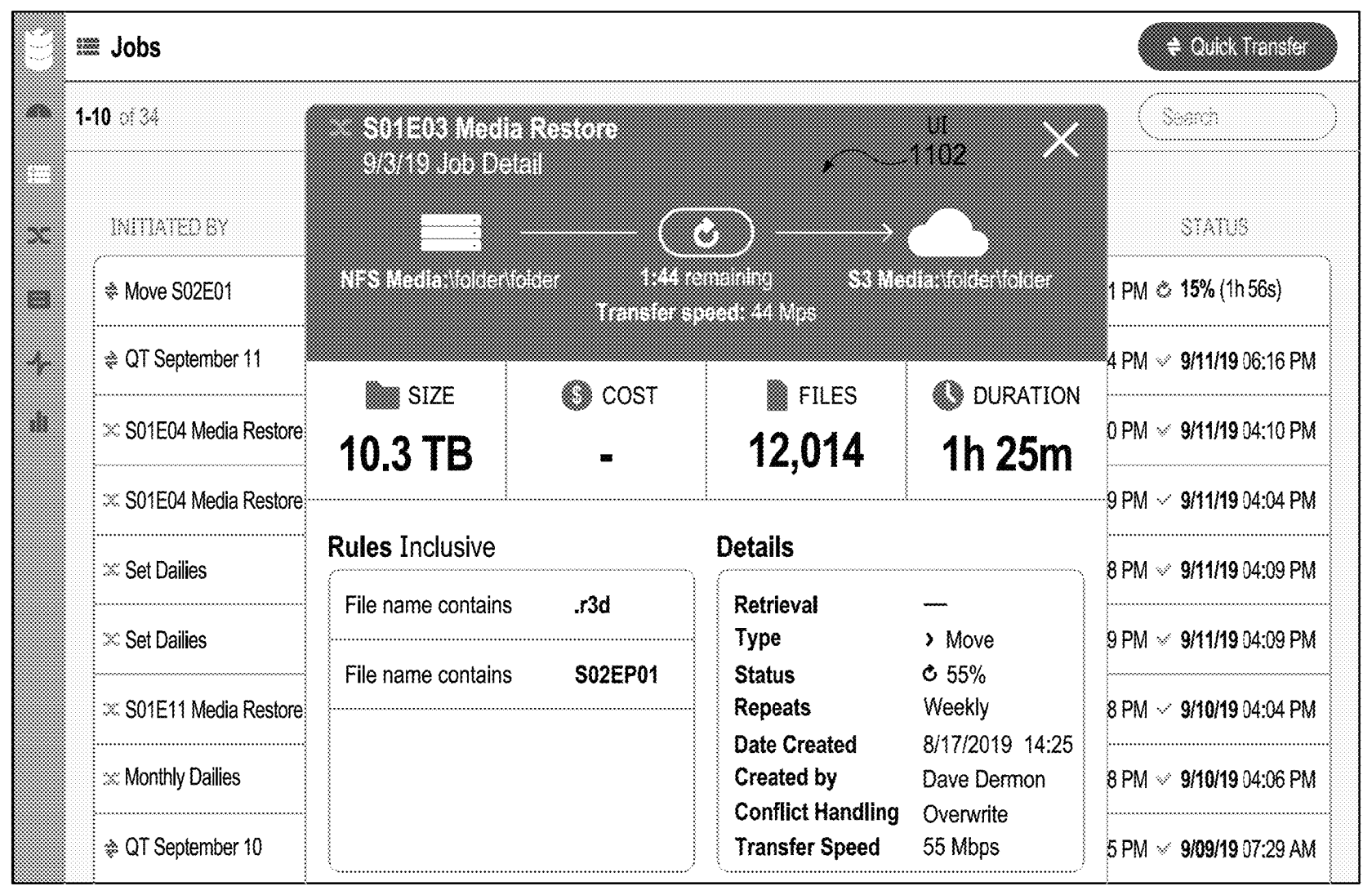

FIG. 11 depicts an example GUI overlay 1102 presenting more detailed metrics relating to a particular data migration job selected from the GUI 1002 depicted in FIG. 10 in accordance with example embodiments of the invention. For example, if an end user selects a particular job from the GUI 1002, the overlay 1102 may be presented. In this example, the overlay 1102 corresponds to an in-progress data migration job and includes information similar to depicted in FIG. 7.

Figure 12:
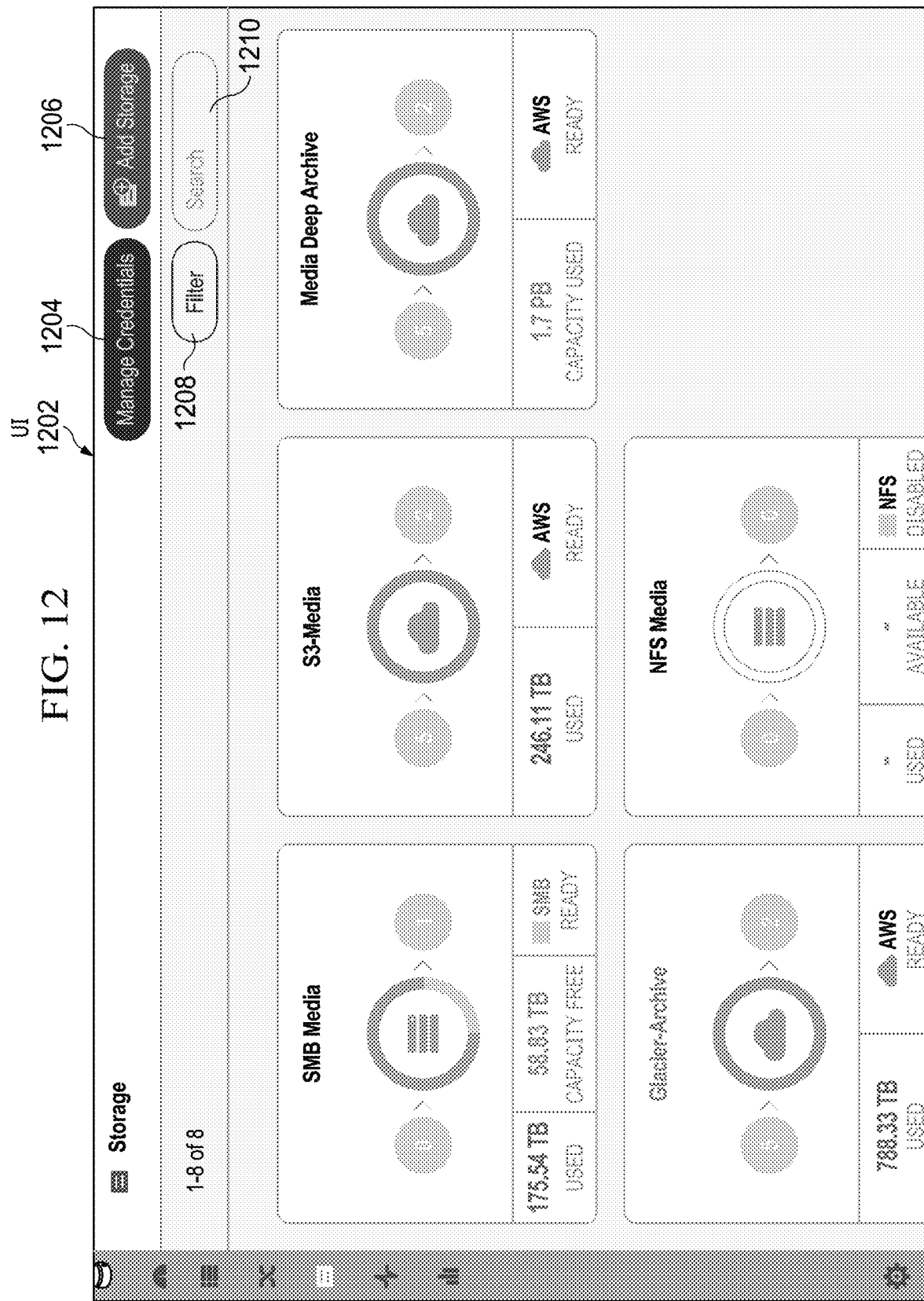
FIG. 12 depicts an example GUI providing data storage metrics for different data storage tiers in accordance with example embodiments of the invention.

FIG. 12 depicts an example GUI 1202 providing data storage metrics for different data storage tiers in accordance with example embodiments of the invention. The GUI 1202 may include a selectable button 1204, control, or the like for managing end user credentials. The GUI 1202 may also include a selectable button 1206, control, or the like to add a new storage tier; a selectable button 1208, control, or the like to filter the information displayed based on various filtering criteria; and a search field 1210 to search for a particular storage tier or all storage tier(s) meeting specified search criteria.

Hardware Implementation

Figure 13:
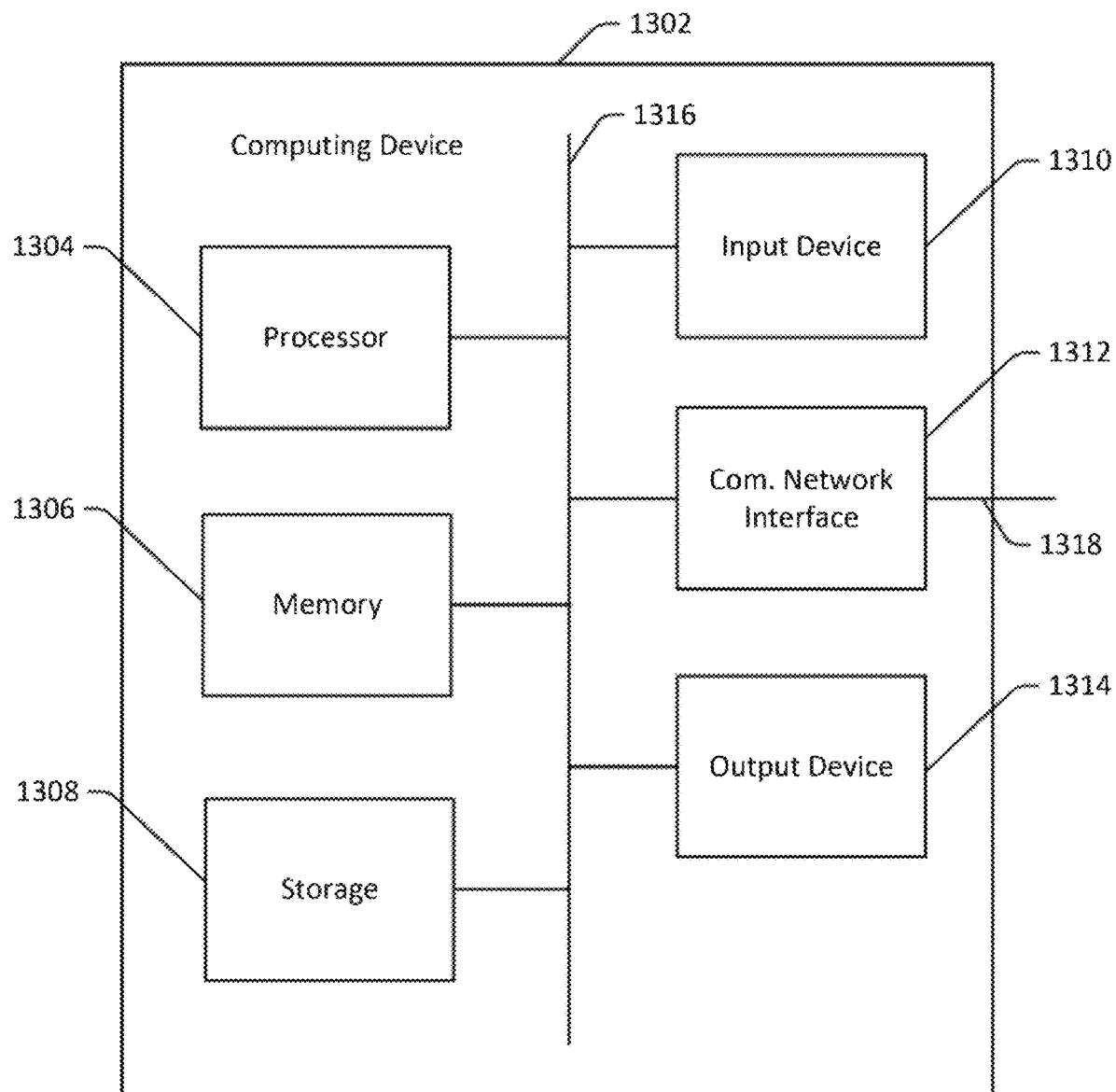
FIG. 13 depicts an example computing device that may be configured to implement features/functionality of the data migration/analysis system disclosed herein in accordance with example embodiments of the invention.

FIG. 13 depicts a diagram of an example implementation of a computing device 1302. Any of the systems, engines, datastores, and/or networks described herein may comprise one or more instances of the computing device 1302. In some example embodiments, functionality of the computing device 1302 is improved to the perform some or all of the functionality described herein. The computing device 1302 comprises a processor 1304, memory 1306, storage 1308, an input device 1310, a communication network interface 1312, and an output device 1314 communicatively coupled to a communication channel 1316. The processor 1304 is configured to execute executable instructions (e.g., programs). In some example embodiments, the processor 1304 comprises circuitry or any processor capable of processing the executable instructions.

The memory 1306 stores data. Some examples of memory 1306 include storage devices, such as RAM, ROM, RAM cache, virtual memory, etc. In various embodiments, working data is stored within the memory 1306. The data within the memory 1306 may be cleared or ultimately transferred to the storage 1308.

The storage 1308 includes any storage configured to retrieve and store data. Some examples of the storage 1308 include flash drives, hard drives, optical drives, cloud storage, and/or magnetic tape. Each of the memory system 1306 and the storage system 1308 comprises a computer-readable medium, which stores instructions or programs executable by processor 1304.

The input device 1310 is any device that inputs data (e.g., mouse and keyboard). The output device 1314 outputs data (e.g., a speaker or display). It will be appreciated that the storage 1308, input device 1310, and output device 1314 may be optional. For example, the routers/switchers may comprise the processor 1304 and memory 1306 as well as a device to receive and output data (e.g., the communication network interface 1312 and/or the output device 1314).

The communication network interface 1312 may be coupled to a network via the link 1318. The communication network interface 1312 may support communication over an Ethernet connection, a serial connection, a parallel connection, and/or an ATA connection. The communication network interface 1312 may also support wireless communication (e.g., 1302.11 a/b/g/n, WiMax, LTE, WiFi). It will be apparent that the communication network interface 1312 may support many wired and wireless standards.

It will be appreciated that the hardware elements of the computing device 1302 are not limited to those depicted in FIG. 13. A computing device 1302 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1304 and/or a co-processor located on a GPU.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A computer-implemented method, comprising:
    receiving, at a first user interface of a data migration system from a client device, a query specifying one or more filtering criteria, a source data repository and a target data repository, the data migration system being coupled via a network to the source data repository and to the target data repository, the data migration system including a source application programming interface (API) for communicating with a source system associated with the source data repository, the data migration system including a target API for communicating with a target system associated with the target data repository;
    receiving by the data migration system a source index corresponding to source data stored at the source data repository, the source index representing a snapshot of metadata associated with the source data contained in the source data repository;
    filtering by the data migration system the source index based at least in part on the one or more filtering criteria specified by the query to obtain a filtered source index;
    applying predetermined rules to enforce restrictions on the filtered source index;
    using by the data migration system the filtered source index as restricted to determine one or more data attributes of an aggregate of the source data corresponding to the filtered source index as restricted;
    determining by the data migration system one or more data retrieval type parameters;
    determining by the data migration system, without initiating a data migration of any of the source data corresponding to the filtered source index as restricted from the source data repository to the target data repository, one or more predicted data migration metrics associated with the data migration of the source data corresponding to the filtered source data index as restricted, the determining the one or more predicted data migration metrics including using the target API to obtain information from the target system to generate the one or more predicted data migration metrics; and
    presenting by the data migration system, to an end user of the client device, a second user interface comprising an indication of the one or more predicted data migration metrics, the first user interface and the second user interface each using a format regardless of any format used by the source system or by the target system.

2. The computer-implemented method of claim 1, wherein the filtering the source index based at least in part on the one or more filtering criteria comprises at least one of: i) filtering the source index based on file type, ii) filtering the source index based on file size, iii) filtering the source index based on filename, iv) filtering the source index based on file modification attributes, or v) filtering the source index based on criteria specified by a third-party client application executing on the client device.

3. The computer-implemented method of claim 1, wherein using the filtered source index as restricted to determine one or more data attributes of the aggregate of the source data corresponding to the filtered source index as restricted comprises determining a number of one or more files contained in the source data corresponding to the filtered source index as restricted and/or an aggregate file size of the one or more files.

4. The computer-implemented method of claim 3, wherein determining the one or more data retrieval type parameters comprises:
    presenting, via the user interface, a set of data retrieval type options for the data migration, the set of data retrieval type options comprising at least a first data retrieval type option and a second data retrieval type option, the second data retrieval type option corresponding to a faster retrieval time and a higher cost than the first data retrieval type option; and
    receiving, via the user interface, a selected data retrieval type option,
    wherein the one or more data retrieval type parameters comprise the selected data retrieval type option.

5. The computer-implemented method of claim 4, wherein the determining the one or more predicted data migration metrics comprises determining a predicted cost of the data migration based at least in part on the one or more data attributes of the aggregate of the source data corresponding to the filtered source index as restricted and the selected data retrieval type option.

6. The computer-implemented method of claim 1, wherein the determining the one or more predicted data migration metrics comprises:
    determining a strength of a network connection between the source data repository and the target data repository; and
    determining a predicted duration of time to complete the data migration based at least in part on the strength of the network connection.

7. The computer-implemented method of claim 1, wherein the source data corresponding to the filtered source index is first source data, and wherein the step of applying predetermined rules to enforce restrictions on the filtered source index comprises:
    determining a number of files contained in the first source data;
    determining that the number of files contained in the first source data exceeds a threshold number of files; and
    determining, based at least in part on determining that the number of files contained in the first source data exceeds the threshold value, that a target index corresponding to the target data repository is required for determining the one or more predicted data migration metrics, the target index representing a snapshot of metadata associated with second target data contained in the target data repository.

8. The computer-implemented method of claim 1, wherein the source data corresponding to the filtered source index as restricted is first source data and target data contained in the target data repository is second target data, the method further comprising:
    identifying a data migration setting specified by the query, the data migration setting indicating that each file in the first source data for which a duplicate corresponding file exists in the second target data is not to be migrated from the source data repository to the target data repository; and determining, based at least in part on identifying the data migration setting, that a target index corresponding to the target data repository is required for determining the one or more predicted data migration metrics, the target index representing a snapshot of metadata associated with second target data contained in the target data repository.

9. The computer-implemented method of claim 8, further comprising prior to determining the one or more predicted data migration metrics:

receiving the target index;

determining a difference between the filtered source index as restricted and the target index, wherein determining the difference comprises identifying each file in the filtered source index as restricted for which a duplicate corresponding file exists in the target index; and filtering out from the filtered source index as restricted the each file in the filtered source index for which the duplicate corresponding file exists in the target index.

10. The computer-implemented method of claim 1, further comprising:

receiving, at the user interface, a selection to initiate the data migration of the source data corresponding to the filtered source index as restricted from the source data repository to the target data repository;

initiating the data migration;

determining that the data migration is complete;

generating one or more metrics indicative of at least one of a data storage characteristic or a data transfer characteristic of the data migration; and storing the one or more metrics, wherein the one or more metrics are retrievable and presentable via one or more graphical user interfaces responsive to a request received from the client device on behalf of the end user.

11. A data migration system, comprising:

at least one processor; and at least one memory storing computer-executable instructions, wherein the at least one processor is configured to access the at least one memory and execute the computer-executable instructions to:

receive, at a first user interface from a client device, a query specifying one or more filtering criteria a source data repository and a target data repository, the data migration system being coupled via a network to the source data repository and to the target data repository, the data migration system including a source application programming interface (API) for communicating with a source system associated with the source data repository, the data migration system including a target API for communicating with a target system associated with the target data repository;

receive a source index corresponding to source data stored at the source data repository, the source index representing a snapshot of metadata associated with the source data contained in the source data repository;

filter the source index based at least in part on the one or more filtering criteria specified by the query to obtain a filtered source index;

apply predetermined rules to enforce restrictions on the filtered source index;

use the filtered source index as restricted to determine one or more data attributes of an aggregate of the source data corresponding to the filtered source index as restricted;

determine one or more data retrieval type parameters;

determine, without initiating a data migration of any of the source data corresponding to the filtered source index as restricted from the source data repository to the target data repository, one or more predicted data migration metrics associated with the data migration of the source data corresponding to the filtered source data index as restricted, the computer-readable instructions further configured to use the target API to obtain information from the target system to generate the one or more predicted data migration metrics; and present, to an end user of the client device, a second user interface comprising an indication of the one or more predicted data migration metrics, the first user interface and the second user interface each using a format regardless of any format used by the source system or by the target system.

12. The data migration system claim 11, wherein the at least one processor is configured to filter the source index based at least in part on the one or more filtering criteria by executing the computer-executable instructions to filter the source index based at least in part on at least one of: i) filtering the source index based on file type, ii) filtering the source index based on file size, iii) filtering the source index based on filename, iv) filtering the source index based on file modification attributes, or v) filtering the source index based on criteria specified by a third-party client application executing on the client device.

13. The data migration system of claim 11, wherein the at least one processor is configured to use the filtered source index as restricted to determine one or more data attributes of the aggregate of the source data corresponding to the filtered source index as restricted by executing the computer-executable instructions to determine a number of one or more files contained in the source data corresponding to the filtered source index as restricted and/or an aggregate file size of the one or more files.

14. The data migration system of claim 13, wherein the at least one processor is configured to determine the one or more data retrieval type parameters by executing the computer-executable instructions to:

present, via the user interface, a set of data retrieval type options for the data migration, the set of data retrieval type options comprising at least a first data retrieval type option and a second data retrieval type option, the second data retrieval type option corresponding to a faster retrieval time and a higher cost than the first data retrieval type option; and receive, via the user interface, a selected data retrieval type option, wherein the one or more data retrieval type parameters comprise the selected data retrieval type option.

15. The data migration system of claim 14, wherein the at least one processor is configured to determine the one or more predicted data migration metrics by executing the computer-executable instructions to determine a predicted cost of the data migration based at least in part on the one or more data attributes of the aggregate of the source data corresponding to the filtered source index as restricted and the selected data retrieval type option.

16. The data migration system of claim 11, wherein the at least one processor is configured to determine the one or more predicted data migration metrics by executing the computer-executable instructions to:
  determine a strength of a network connection between the source data repository and the target data repository; and
  determine a predicted duration of time to complete the data migration based at least in part on the strength of the network connection.

17. The data migration system of claim 11, wherein the data corresponding to the filtered source index is first source data, wherein the one or more data attributes comprises a number of files contained in the first source data, and wherein the at least one processor is further configured to execute the computer-executable instructions to:
  determine that the number of files contained in the first source data exceeds a threshold number of files; and
  determine, based at least in part on determining that the number of files contained in the first source data exceeds the threshold value, that a target index corresponding to the target data repository is required to determine the one or more predicted data migration metrics, the target index representing a snapshot of metadata associated with second target data contained in the target data repository.

18. The data migration system of claim 11, wherein the source data corresponding to the filtered source index as restricted is first source data and target data contained in the target data repository is second target data, and wherein the at least one processor is further configured to execute the computer-executable instructions to:
  identify a data migration setting specified by the query, the data migration setting indicating that each file in the first source data for which a duplicate corresponding file exists in the second target data is not to be migrated from the source data repository to the target data repository; and
  determine, based at least in part on identifying the data migration setting, that a target index corresponding to the target data repository is required for determining the one or more predicted data migration metrics, the target index representing a snapshot of metadata associated with second target data contained in the target data repository.

19. The data migration system of claim 18, wherein, prior to determining the one or more predicted data migration metrics, the at least one processor is further configured to execute the computer-executable instructions to:
  receive the target index;
  determine a difference between the filtered source index as restricted and the target index, wherein determining the difference comprises identifying each file in the filtered source index as restricted for which a duplicate corresponding file exists in the target index; and
  filter out from the filtered source index the each file in the filtered source index as restricted for which the duplicate corresponding file exists in the target index.

20. The data migration system of claim 11, wherein the at least one processor is further configured to execute the computer-executable instructions to:
  receive, at the user interface, a selection to initiate the data migration of the source data corresponding to the filtered source index as restricted from the source data repository to the target data repository;
  initiate the data migration;
  determine that the data migration is complete;
  generate one or more metrics indicative of at least one of a data storage characteristic or a data transfer characteristic of the data migration; and
  store the one or more metrics, wherein the one or more metrics are retrievable and presentable via one or more graphical user interfaces responsive to a request received from the client device on behalf of the end user.

21. A computer program product comprising a non-transitory computer-readable medium readable by a processing circuit, the non-transitory computer-readable medium storing instructions executable by the processing circuit to cause a method to be performed, the method comprising:
  receiving, at a first user interface of a data migration system from a client device, a query specifying one or more filtering criteria, a source data repository and a target data repository, the data migration system being coupled via a network to the source data repository and to the target data repository, the data migration system including a source application programming interface (API) for communicating with a source system associated with the source data repository, the data migration system including a target API for communicating with a target system associated with the target data repository;
  receiving by the data migration system a source index corresponding to source data stored at the source data repository, the source index representing a snapshot of metadata associated with the source data contained in the source data repository;
  filtering by the data migration system the source index based at least in part on the one or more filtering criteria specified by the query to obtain a filtered source index;
  applying predetermined rules to enforce restrictions on the filtered source index;
  using by the data migration system the filtered source index as restricted to determine one or more data attributes of an aggregate of the source data corresponding to the filtered source index as restricted;
  determining by the data migration system one or more data retrieval type parameters;
  determining by the data migration system, without initiating a data migration of any of the source data corresponding to the filtered source index as restricted from the source data repository to the target data repository, one or more predicted data migration metrics associated with the data migration of the source data corresponding to the filtered source data index as restricted, the determining the one or more predicted data migration metrics including using the target API to obtain information from the target system to generate the one or more predicted data migration metrics; and
  presenting by the data migration system, to an end user of the client device, a second user interface comprising an indication of the one or more predicted data migration metrics, the first user interface and the second user interface each using a format regardless of any format used by the source system or by the target system.

* * * * *